United States Patent [19]

Yamazaki

[11] Patent Number: 5,526,095
[45] Date of Patent: Jun. 11, 1996

[54] IMAGE READING APPARATUS HAVING VARIABLE POWER OPTICAL SYSTEM INCLUDING FIRST AND SECOND FIXED FOCUS LENS GROUPS

[75] Inventor: Yoshihiro Yamazaki, Tokyo, Japan

[73] Assignee: Asahi Kogaku Kogyo Kabushiki Kaisha, Tokyo, Japan

[21] Appl. No.: 107,631

[22] Filed: Aug. 18, 1993

[30] Foreign Application Priority Data

Aug. 20, 1992 [JP] Japan ................. 4-063996 U
Aug. 20, 1992 [JP] Japan ................. 4-063997 U
Aug. 20, 1992 [JP] Japan ..................... 4-244277

[51] Int. Cl.⁶ ........................... G03B 27/40; H01J 3/14
[52] U.S. Cl. .............................. 355/57; 250/234
[58] Field of Search ................. 382/65, 58; 250/235, 250/236, 234; 355/58, 57, 55, 60; 359/209, 210, 211, 212

[56] References Cited

U.S. PATENT DOCUMENTS

| | | | |
|---|---|---|---|
| 4,420,248 | 12/1983 | Ogawa et al. | 355/57 |
| 4,436,416 | 3/1984 | Negoro et al. | 355/57 |
| 4,557,594 | 12/1985 | Negoro | 355/58 |
| 4,918,306 | 4/1990 | Saito | 250/235 |
| 5,027,424 | 6/1991 | Yamazaki et al. | |

*Primary Examiner*—Benjamin R. Fuller
*Assistant Examiner*—Craig A. Hallacher
*Attorney, Agent, or Firm*—Greenblum & Bernstein

[57] ABSTRACT

An image reading apparatus equipped In an electronic copying apparatus has a variable-power optical system including a first and second fixed focus lens group mounted on a lens mount base. Each lens group has a different magnifying power. The lens mount base is moved by a motor to a partial position and then by a biasing mechanism to the final position such that in one final position the optical axis of the first lens group is aligned with the incident ray axis, and in another final position the optical axis of the second lens group is aligned with the incident ray axis. Further when the first lens group is employed a movable reflecting mirror is positioned such that it is out of the incident ray axis. When the second lens group is employed, the movable reflecting mirror is positioned such that is placed in the incident ray axis to reflect the incident ray to the second lens group. Further, the reflecting mirror is moved in conjunction with the movement of the lens mount base. The movable reflecting mirror is further held in place by a retaining mechanism to prevent the movable reflecting mirror from being accidentally moved from the desired position.

52 Claims, 14 Drawing Sheets

IMAGE READING APPARATUS HAVING VARIABLE POWER OPTICAL SYSTEM INCLUDING FIRST AND SECOND FIXED FOCUS LENS GROUPS

FIELD OF THE INVENTION

The present invention relates to an image reading apparatus equipped with, for example, an electronic copying apparatus, and more particularly to an image reading apparatus provided with a variable-power optical system capable of switching between at least two magnifying powers, a mechanism for transporting a movable base between two spaced positions, and a reflecting mirror assembly for moving a reflecting mirror between two spaced positions.

BACKGROUND OF THE INVENTION

Conventionally, an image reading apparatus is provided with an optical system including a single fixed-focus lens. The magnifying power of the optical system may be varied by changing the length of its optical path and moving the lens. The magnifying power of an optical system having a zoom lens may be varied by changing the focal length of the zoom lens.

However, the optical system which has a single fixed-focus lens cannot set its magnifying power to a large value, and requires complex mechanisms for changing the length of the optical path and moving the lens. The optical system with a zoom lens is disadvantageous in that the lens performance is lowered when the magnifying power is set to a large value. Because of various problems that are posed by a large magnifying power value, both of these optical systems require improvements.

Various mechanisms have heretofore been devised and implemented for transporting a movable base between first and second positions and accurately positioning and holding the movable base at these positions. To accomplish this, it is preferable to have the movable base contact the first and second positioning stops which define these positions.

If the movable base is kept in contact with the first and second positioning stops by drive forces produced by a motor, then the motor will have an excessive load, consume a large amount of electric energy, and become excessively heated. After the motor is de-energized, since no forces are applied to hold the movable base in the first or second position, the movable base is free to move, and does so when an apparatus, that incorporates this mechanism, is moved around.

If the motor is to be de-energized while the movable base contacts the first or second positioning stop, then a highly accurate sensor is needed to detect the present position of the movable base. Use of such a sensor results in an increased cost.

Previously, there has been devised and used a reflecting mirror assembly for moving a reflecting mirror between a first position, which is an upper position, and a second position, which is a lower position. To accurately position and hold the reflecting mirror in the upper and lower positions, it is preferable that the reflecting mirror contact the upper and lower positioning stops which define these positions.

If the reflecting mirror is kept in contact with the upper and lower positioning stops by drive forces produced by a motor, then the motor will have an excessive load, consume a large amount of electric energy, and become excessively heated. To avoid these difficulties, the reflecting mirror may be driven to an upper position by the motor, and then a coil spring may be used to hold the reflecting mirror in the upper position, thus requiring that no force be applied from the motor to the reflecting mirror. Since, however, the reflecting mirror is held in the upper position only by the coil spring, the reflecting mirror may be forcibly moved from the upper position to a lower position against the bias of the coil spring, when shocks are imposed on the reflecting mirror, when it is in the upper position.

SUMMARY OF THE INVENTION

It is therefore an object of the present invention to provide an image reading apparatus which is of a relatively simple structure and is capable of setting its magnifying power to a large value without lowering lens performance thereof.

Another object of the present invention is to provide an image reading apparatus capable of transporting a movable base between first and second positions with a motor, and positioning and stopping the movable base in the first and second positions without imposing an undue load on the motor or by employing an expensive sensor.

Still another object of the present invention is to provide an image reading apparatus which is capable of angularly moving a reflecting mirror between first and second positions and of reliably preventing the reflecting mirror from being accidentally turned from the first position to the second position or vice versa.

According to an aspect of the present invention, there is provided an image reading apparatus for reading an image contained on a document. The image reading apparatus includes a light source for emitting light to said image of the document, a variable-power optical system for guiding light reflected by said image through a predetermined optical path with varying magnification of said image, and an image sensing means for receiving light reflected by said image and guided by said light guide means and for sensing said image from said received light. The variable-power optical system includes a focusing means having at least two focal lengths, a plurality of reflecting means for reflecting an incident light ray to said focusing means, and a selecting means for selecting one of said at least two focal lengths of said focusing means. A transport means is provided for moving said focusing means to a first position, and one of said plurality of reflecting means to an upper position when one of said at least two focal lengths is selected by said selecting means. The transport device moves said focusing means to a second position and said one of said plurality of reflecting means to a lower position when another of said at least two focal lengths are selected by said selecting means. A retaining means is included for retaining said one of said plurality of reflecting means in said upper positlon when said one of said at least two focal lengths is selected, and for retaining said one of said plurality of reflecting means in said lower position when said another of said at least two focal lengths is selected.

According to another aspect of the present invention, there is provided an image reading apparatus for reading an image contained on a document including: a light source for emitting light to said image of the document, and a variable-power optical system for guiding light reflected by said image through a predetermined optical path with varying magnification of said image. An image sensing means is included for receiving light reflected by said image and guided by said light guide means and for sensing said image from said received light. The variable-power optical system includes a first focusing means having a first magnification, a second focusing means having a second magnification, and a fixed reflecting means. The variable-power optical system further includes a support means for supporting said first and second focusing means, a movable reflecting means, a selecting means for selecting one of said first and second magnifications, such a transport means for moving said support means to a first position and said movable reflecting means to an upper position when said first magnification is selected, and for moving said support means to a second position and said movable reflecting means to a lower position when said second magnification is selected.

According to still another aspect of the present invention, there is provided an image reading apparatus for reading an image contained on a document including a light source for emitting light to said image of the document, a variable-power optical system for guiding light reflected by said image through a predetermined optical path with varying magnification of said image, and an image sensing means for receiving light reflected by said image and guided by said light guide means and for sensing said image from said received light. The variable-power optical system includes a first focusing means, a second focusing means and a fixed reflecting means. The variable-power optical system further includes a movable reflecting means; selecting means for selecting one of said focusing means, and a transport means for moving said movable reflecting means to an upper position when said first focusing means is selected by said reflecting means, and for moving said movable reflecting means to a lower surface when said second focusing means is selected by said selecting means.

According to a different aspect of the present invention, there is provided an image reading apparatus for reading an image contained on a document including: a light source for emitting light to said image contained on the document, a variable-power optical system for guiding light reflected by said image through a predetermined optical path with varying magnification of said image, and an image sensing means for receiving light reflected by said image and guided by said light guide means and for sensing said image from said received light. The said variable-power optical system includes a first lens group having a first magnification, and a second lens group having a second magnification with the first and second lens groups being movable between a first position in which an optical axis of said first lens group is aligned with said predetermined optical path, and a second position in which an optical axis of said second lens group is aligned with said predetermined optical path. The variable-power optical system further includes a fixed reflecting mirror for reflecting said reflected light to said image sensing means, and a movable reflecting mirror movable between a retracted position in which said movable reflecting mirror is positioned out of said predetermined optical path to allow said fixed reflecting mirror to reflect said reflected light to said image sensing means, and a reflecting position in which said movable reflecting mirror is positioned in said predetermined optical path to allow the movable reflecting mirror to reflect said reflected light to said image sensing means. A magnification switching is included for moving said first and second lens groups into said first position and moving said movable reflecting mirror into said retracted position when said first magnification is selected, and for moving said first and second lens groups into said second position and moving said movable reflecting mirror into said reflecting position when said second magnification is selected.

According to still different aspect of the present invention, there is provided an image reading apparatus for reading an image contained on a document including, a light source for emitting light to said image of the document, a variable-power optical system for guiding light reflected by said image through a predetermined optical path with varying magnification of said image, and an image sensing means for receiving light reflected by said image and guided by said light guide means and for sensing said image from said received light. The said variable-power optical system includes a movable base on which a first lens group having a first magnification and a second lens group having a second magnification are mounted, with the movable base being movable between a first position in which an optical axis of said first lens group is aligned with said predetermined optical path and a second position in which an optical axis of said second lens group is aligned with said predetermined optical path. The variable-power optical system further includes a guide means for guiding said movable base reciprocally movably between said first and second positions, a positioning stop for engaging one end of said movable base to place the movable base in said first position, positioning means for defining a third position immediately short of said first position, an actuating means for reciprocally moving said movable base; a control means for de-energizing said actuating means when said movable base has reached said third position during movement of the movable base toward said first position with drive forces from said actuating means, and a biasing means for resiliently biasing said movable base into engagement with said first positioning stop when said movable base has reached said third position during movement of the movable base toward said first position.

According to still another different aspect of the present invention, there is provided an image reading apparatus for reading an image contained on a document including a light source for emitting light to said image of the document, a variable-power optical system for guiding light reflected by said image through a predetermined optical path with varying magnification of said image, and an image sensing means for receiving light reflected by said image and guided by said light guide means and for sensing said image from said received light. The said variable-power optical system includes a movable base on which a first lens group having a first magnification and a second lens group having a second magnification are mounted, with the movable base being movable between a first position in which an optical axis of said first lens group is aligned with said predetermined optical path and a second position in which an optical axis of said second lens group is aligned with said predetermined optical path. The variable-power optical system further includes a guide means for guiding said movable base reciprocally movably between said first and second positions, a first positioning stop for engaging one end of said movable base to place the movable base in said first position, a second positioning stop for engaging an opposite end of said movable base to place the movable base in said second position, a first positioning means for defining a third position immediately short of said first position, a second positioning means for defining a fourth position immediately short of said second position, and an actuating means for reciprocally moving said movable base. The variable-power optical system further includes a control means for de-energizing said actuating means when said movable base has moved from said fourth position to said third position or from said third position to said fourth position with drive forces from said actuating means, a first biasing means for resiliently biasing said movable base into engagement with said first positioning stop when said movable base has moved from said fourth position to said third position, and a second biasing means for resiliently biasing said movable base into engagement with said second positioning stop when said movable base has moved from said third position to said fourth position.

DESCRIPTION OF THE ACCOMPANYING DRAWINGS

DESCRIPTION OF THE EMBODIMENT

The principles of the present invention are particularly advantageous when embodied in an image reading apparatus.

Figure 1:
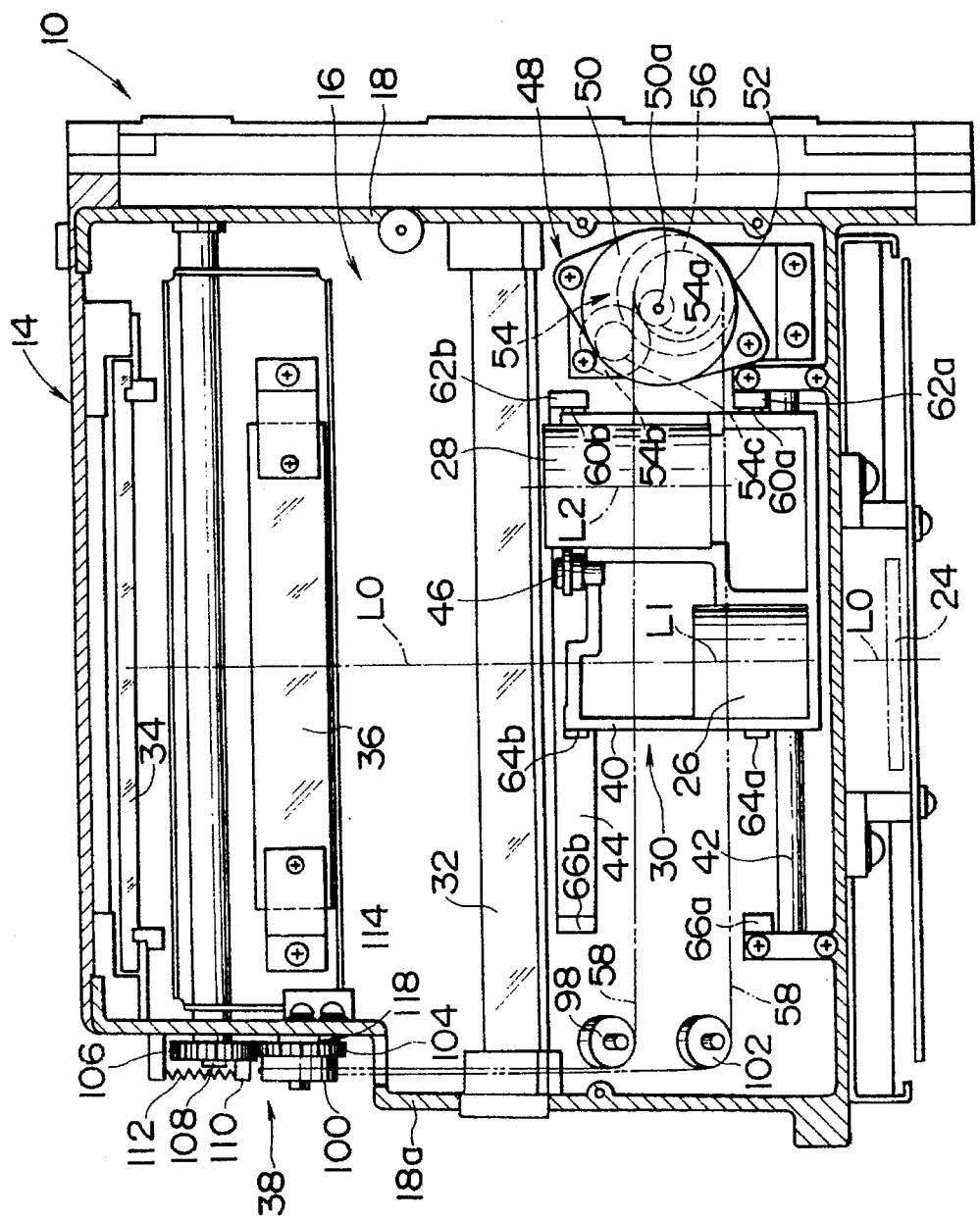
FIG. 1 is a sectional plan view of an internal structure of an image reading apparatus with the parts in a first magnification state, i.e., with a lens mount base in a first position and a first fixed-focus lens group having an optical axis aligned with the axis of an incident ray of light.
Figure 2:
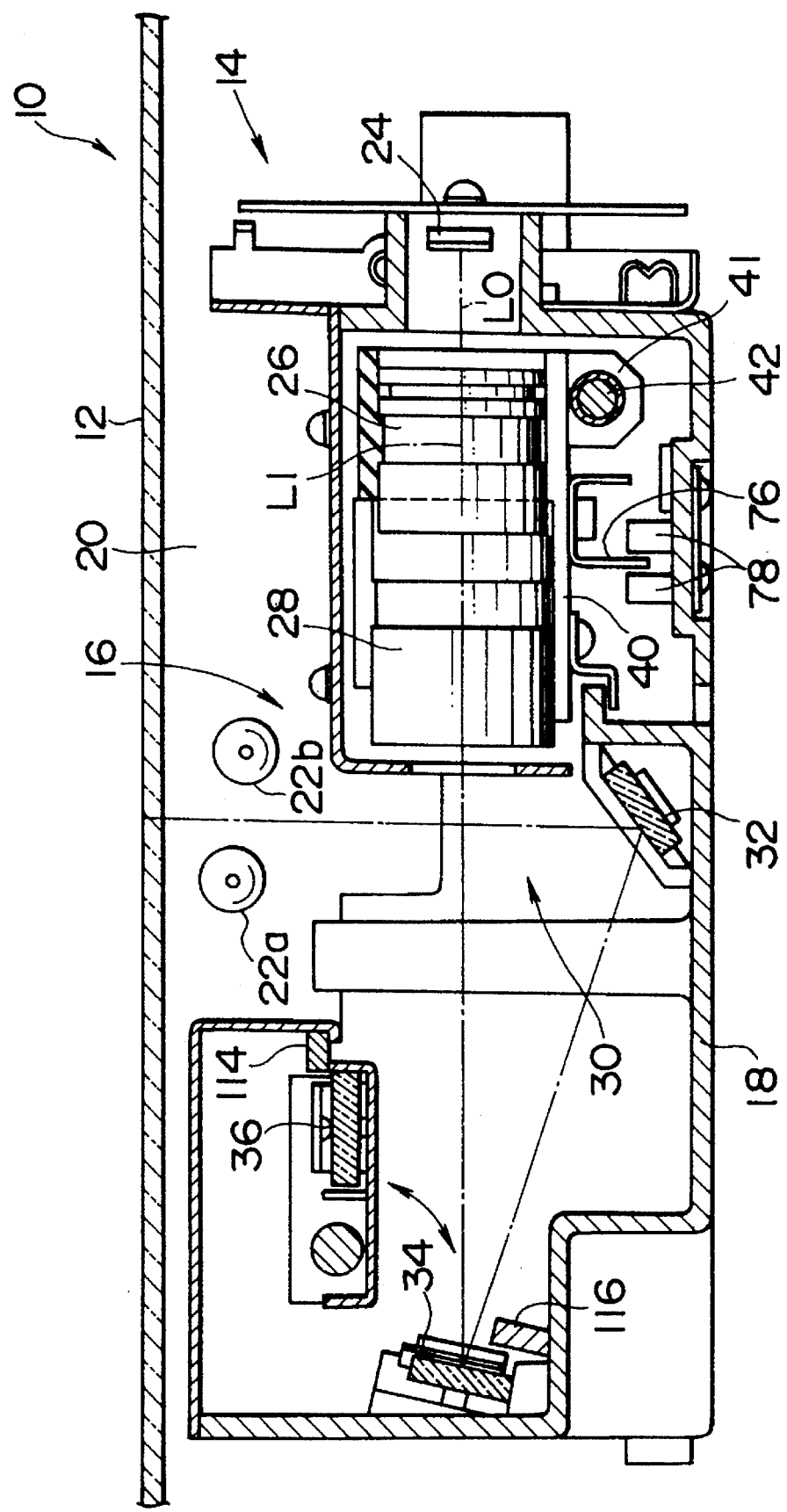
FIG. 2 is a sectional side elevational view of the internal structure of the image reading apparatus as shown in FIG. 1.
Figure 3:
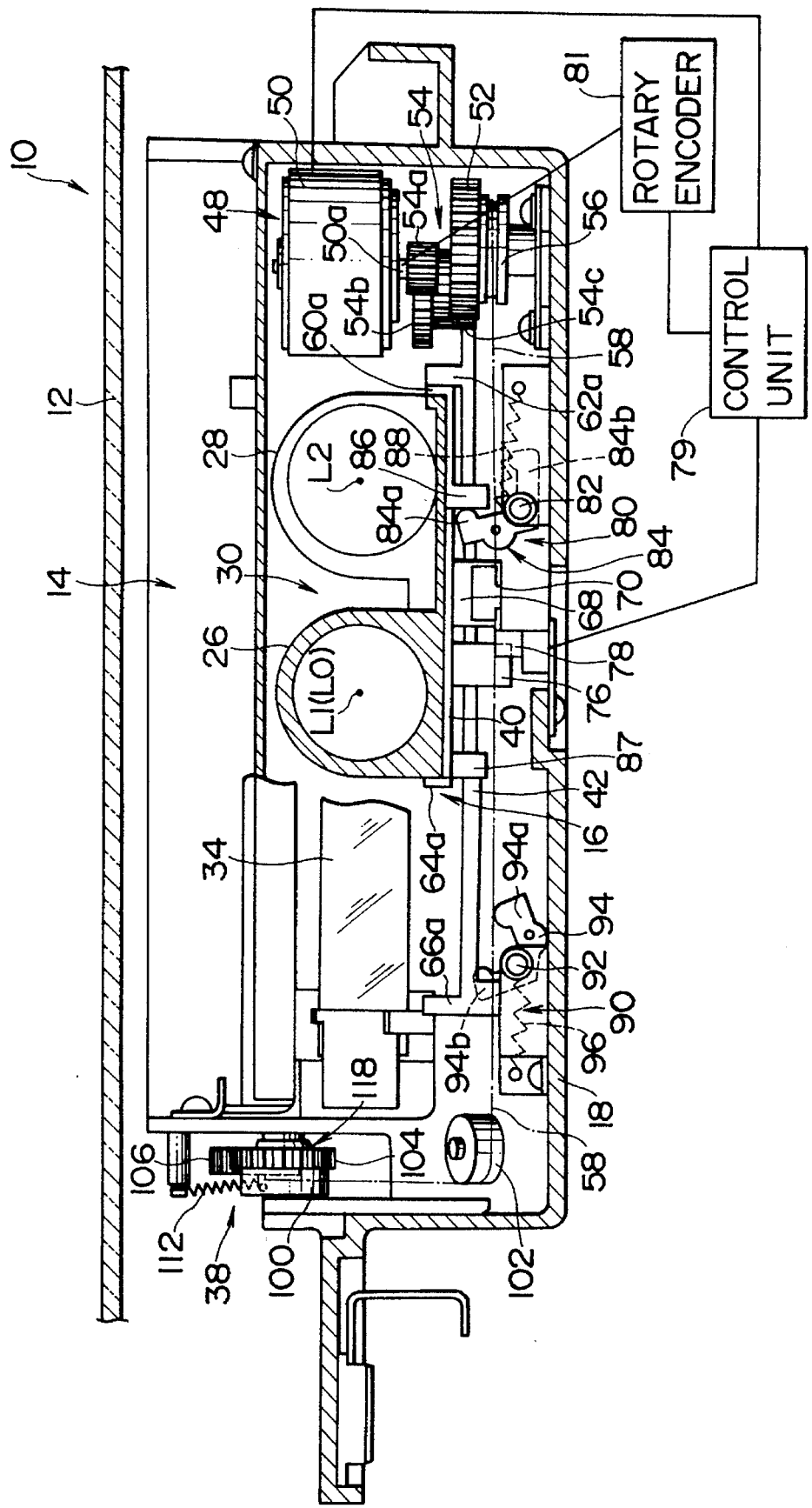
FIG. 3 is a sectional front elevational view of the internal structure of the image reading apparatus as shown in FIG. 1.

As shown in FIGS. 1 through 3, an image reading apparatus 10 generally comprises an outer casing (not shown), a platen 12 of glass (see FIGS. 2 and 3) movably mounted on an upper end of the outer casing for placing a document to be copied thereon, an image reading unit 14 mounted in the outer casing below the platen 12, and an image forming unit (not shown) for forming a copied image of the document on a sheet (not shown) based on image information read by the image reading unit 14 according to the electrophotographic process. The image reading apparatus 10 has a scanning mechanism (not shown) for scanning the document on the platen 12 to read the image information therefrom by producing relative movement between the image reading unit 14 and the platen 12. While the image reading unit 14 is fixed in position and the platen 12 is movable with respect to the image reading unit 14 in the illustrated embodiment, the platen 12 may be fixed in position and the image reading unit 14 may be movable with respect to the fixed platen 12.

The image reading unit 14 has a variable-power optical system 16. More specifically, the image reading unit 14 includes a housing 18 secured to the outer casing of the image reading apparatus 10. The housing 18 has an opening 20 (see FIG. 2) defined in its upper end for allowing reflected light, i.e., scanned light, from the document to enter the housing 18. A pair of spaced lamps 22a, 22b is positioned in an image reading position in the opening 20 for applying light to the image-bearing surface of the document that is placed on the platen 12. The housing 18 supports a line sensor 24 (see FIGS. 1 and 2) comprising a CCD, for example, on a side panel thereof. The line sensor 24 produces one line of image information in response to the reflected light from the document in the image reading position. The produced line of image information is supplied to an image processor (not shown) which is electrically connected to the line sensor 24. The image processor generates one page of image information from supplied lines of image information through an image processing operation.

The variable-power optical system 16, which is capable of varying the magnification of the image represented by the reflected light from the document, is disposed to guide the reflected light from the document to the line sensor 24. As shown in FIG. 1, the variable-power optical system 16 includes first and second fixed-focus lens groups 26, 28 having different magnifying powers, respectively. The first and second fixed-focus lens groups 26, 28 have optical axes L1, L2 respectively, that can selectively be brought by a magnification switching mechanism 30 into alignment with an incident ray axis L0 along which the reflected light is applied to the line sensor 24. The first fixed-focus lens group 26 has a first magnifying power that is set to a value of 0.128, and the second fixed-focus lens group 28 has a second magnifying power that is set to a value of 0.256. Therefore, the magnifying power of the variable-power optical system 16 is 2 (=0.256/0.128).

Figure 4:
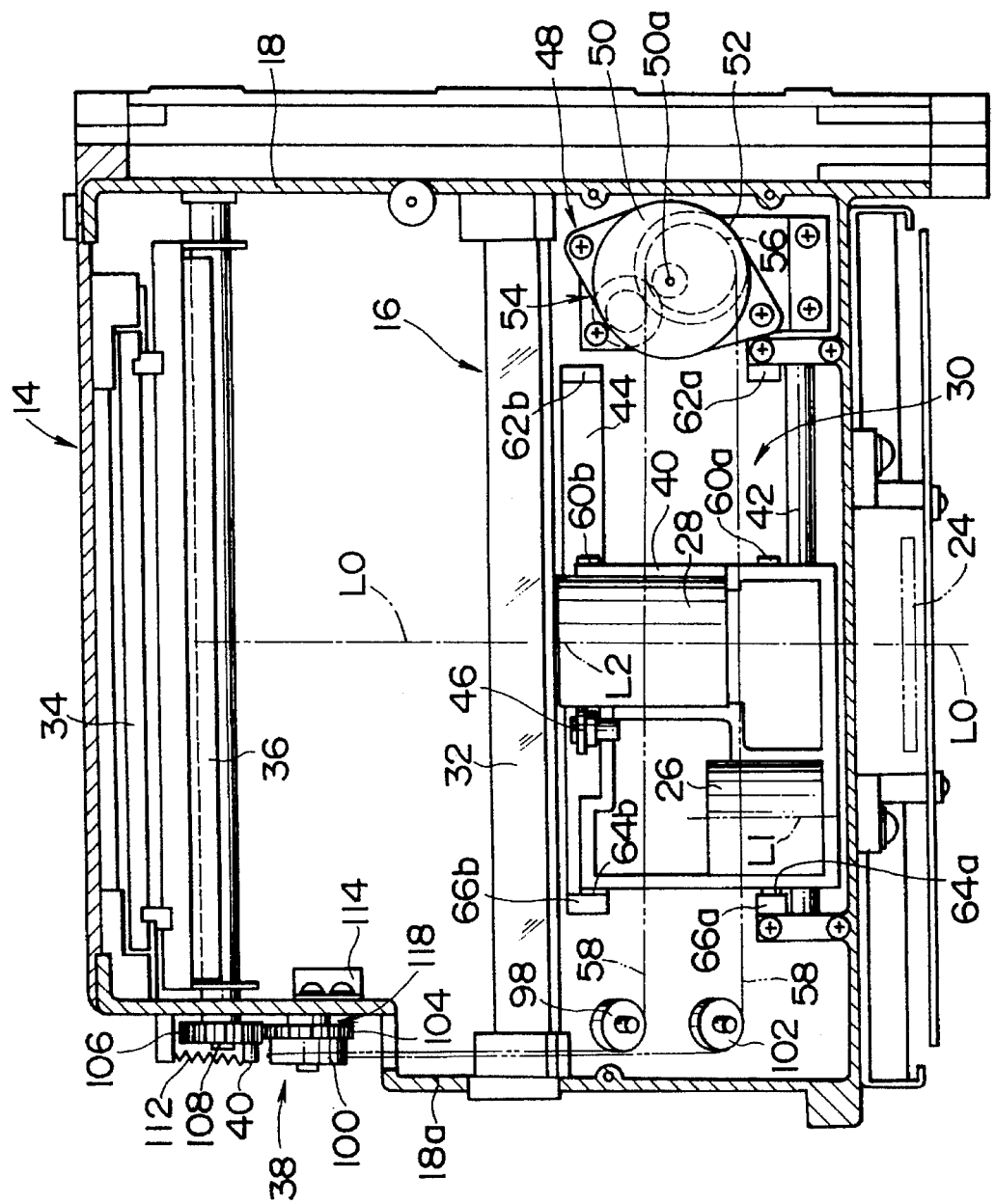
FIG. 4 is a sectional plan view of the internal structure of the image reading apparatus with the lens mount base in a second position and a second fixed-focus lens group having an optical axis aligned with the axis of an incident ray of light.

As shown in FIG. 2, the variable-power optical system 16 also has a first fixed reflecting mirror 32 disposed on a lower panel of the housing 18 substantially below the image reading position for reflecting the reflected light from the document in a direction opposite to the line sensor 24, and a second fixed reflecting mirror 34 disposed on a side panel of the housing 13 remote from the line sensor 24 for reflecting the reflected light from the first fixed reflecting mirror 32 to the first fixed-focus lens group 26 when the first fixed-focus lens group 26 is selected for its first magnifying power by the magnification switching mechanism 30, i.e., when the optical axis L1 of the first fixed-focus lens group 26 is aligned with the incident ray axis L0, as shown in FIG. 1. The variable-power optical system 16 further includes a movable reflecting mirror 36 angularly movably supported in the housing 13 for reflecting the reflected light from the first fixed reflecting mirror 32 to the second fixed-focus lens group 28 when the second fixed-focus lens group 28 is selected for its second magnifying power by the magnification switching mechanism 30, i.e., when the optical axis L2 of the second fixed-focus lens group 28 is aligned with the incident ray axis L0, as shown in FIG. 4.

Figure 5:
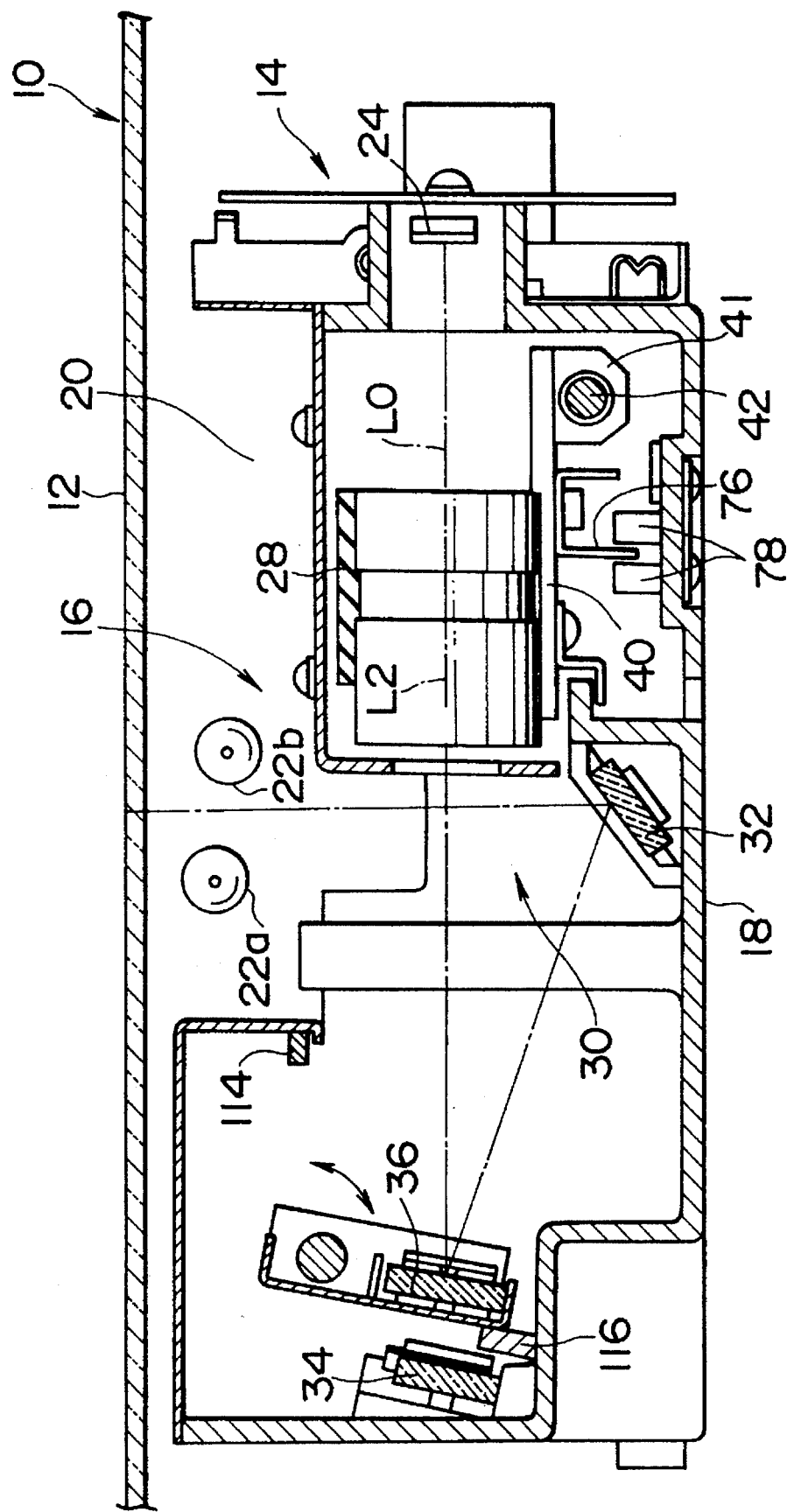
FIG. 5 is a sectional side elevational view of the internal structure of the image reading apparatus as shown in FIG. 4.

As shown in FIG. 2, the movable reflecting mirror 36 is angularly movable between an upper position in which it is retracted upwardly out of interference with the incident ray axis L0 thus allowing the reflected light from the first fixed reflecting mirror 32 to fall on the second fixed reflecting mirror 34, as shown in FIG. 2, and a lower position in which it is positioned across the incident ray axis L0 thus receiving the reflected light from the first fixed reflecting mirror 32, as shown in FIG. 5. The movable reflecting mirror 36 can be angularly moved by a turning mechanism 38, described later on, which is actuated in synchronism with the magnification switching mechanism 30.

More specifically, when the optical axis L1 of the first fixed-focus lens group 26 is aligned with the incident ray axis L0 by the magnification switching mechanism 30, the movable reflecting mirror 36 is located at the upper position by the turning mechanism 38 ganged with the magnification switching mechanism 30, allowing the reflected light from the first fixed reflecting mirror 32 to fall on the second fixed reflecting mirror 34. As a result, the reflected light from the first fixed reflecting mirror 32 is reflected by the second fixed reflecting mirror 34, and passes through the first fixed-focus lens group 26 to the line sensor 24 while the image represented by the reflected light is being magnified by the first fixed-focus lens group 26. Conversely, when the optical axis L2 of the second fixed-focus lens group 28 is aligned with the incident ray axis L0 by the magnification switching mechanism 30, the movable reflecting mirror 36 is turned to the lower position in front of the second fixed reflecting mirror 36 by the turning mechanism 38 ganged with the magnification switching mechanism 30. As a consequence, the reflected light from the first fixed reflecting mirror 32 is reflected by the movable reflecting mirror 36, and passes through the second fixed-focus lens group 28 to the line sensor 24 while the image represented by the reflected light is being magnified by the second fixed-focus lens group 28.

The magnification switching mechanism 30 will now be described below with reference to FIGS. 1 through 12.

The magnification switching mechanism 30 has a lens mount base 40 (see FIGS. 2, 3, 5) on which the first and second fixed-focus lens groups 26, 28 are supported. The lens mount base 40 is movable between a first position, shown in FIGS. 1 through 3, in which the optical axis L1 of the first fixed-focus lens group 26 is aligned with the incident ray axis L0, and a second position, shown in FIGS. 4, 5, and 10, in which the optical axis L2 of the second fixed-focus lens group 28 is aligned with the incident ray axis L0. Specifically, a slider guide 41 is integrally attached to the lower surface of a side of the lens mount base near the line sensor 24. The slider guide 41 is slidably fitted over a guide shaft 42 securely mounted in the housing 18 and extending horizontally perpendicularly to the incident ray axis L0, i.e., along the side panel of the housing 18 which supports the line sensor 24. A guide rail 44 (see FIGS. 1 and 4) extending parallel to the guide shaft 42 is disposed in the housing 18 near an opposite side of the lens mount base 40 near the first fixed reflecting mirror 32 remote from the guide shaft 42.

The guide shaft 42 and the guide rail 44 are fixedly supported on the lower panel of the housing 18. A roller 46 is rotatably mounted on the opposite side of the lens mount base 40 in rolling contact with an upper surface of the guide rail 44, the roller 46 being rotatable about an axis parallel to the incident ray axis L0. Therefore, the lens mount base 40 is supported on the guide shaft 42 and the guide rail 44 for horizontal movement along an axis perpendicular to the incident ray axis L0.

The magnification switching mechanism 30 has an actuator mechanism 48 (see FIGS. 1, 3, 4, 9, and 11) for moving the lens mount base 40 along the guide shaft 42 and the guide rail 44. The actuator mechanism 48 includes a reversible motor 50 having a motor shaft 50a rotatable about a vertical axis, and a speed reducer mechanism 54 for transmitting the rotation of the motor shaft 50a at a certain speed reduction ratio to an output gear 52 that is rotatably supported on the lower panel of the housing 18. The speed reducer mechanism 54 includes a smaller drive gear 54a coaxially fixed to the motor shaft 50a, a first larger-diameter idler gear 54b meshing with the drive gear 54a, and a second smaller-diameter idler gear 54c coaxially fixed to the first larger-diameter idler gear 54b and meshing with the output gear 52. To the output shaft 52, there is coaxially fixed an output pulley 56 with a wire 58 trained therearound.

The lens mount base 40 has a pair of first lateral protrusions 60a, 60b (see FIG. 1) integrally mounted on a right-hand side surface thereof and a pair of second lateral protrusions 64a, 64b integrally mounted on a left-hand side surface thereof. When the lens mount base 40 is moved to the first position, it is accurately held in the first position by the first protrusions 60a, 60b when contacting the first positioning stops 62a, 62b projecting upwardly from the right-hand end of the guide shaft 42 and the guide rail 44, respectively. When the lens mount base 40 is moved to the second position, it is accurately held in the second position by the second protrusions 64a, 64b when it contacts the second positioning stops 66a, 66b projecting upwardly from the left-hand end of the guide shaft 42 and the guide rail 44, respectively.

Figure 6:
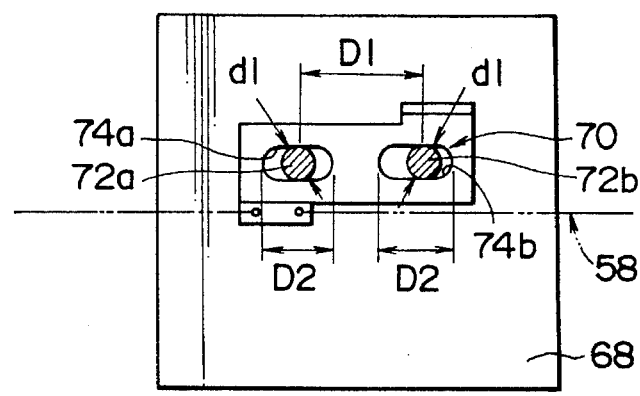
FIG. 6 is a front elevational view of a connector to which a wire of a magnification switching mechanism is connected and an attachment attached to the lens mount base, the connector and the attachment being operatively coupled to each other.

As shown in FIG. 3, the wire 58 has an end coupled to one side of a connector 70 (see FIG. 6) that is movably attached to an attachment 68 integrally projecting down from a lower surface of the lens mount base 40. The connector 70 can be moved a distance D0 (see FIGS. 7 and 8) with respect to the attachment 68 in the direction in which the lens mount base 40 is movable. The wire 58 is operatively coupled to the turning mechanism 38, and has its other end coupled to an opposite side of the connector 70. More specifically, as shown in FIG. 6, a pair of horizontally extending rods 72a, 72b each having a diameter of d1 are mounted on a vertical side surface of the attachment 68. The rods 72a, 72b are spaced from each other by a distance D1. The connector 70 has a pair of horizontal slots 74a, 74b defined therein with the rods 72a, 72b are fitted respectively therein. Each of the slots 74a, 74b has a length D2 in the direction in which the lens mount base 40 is movable. Therefore, the distance D0, the distance d1, and the length D2 are related to each other as follows:

$$D2=D0+d1.$$

Figure 7:
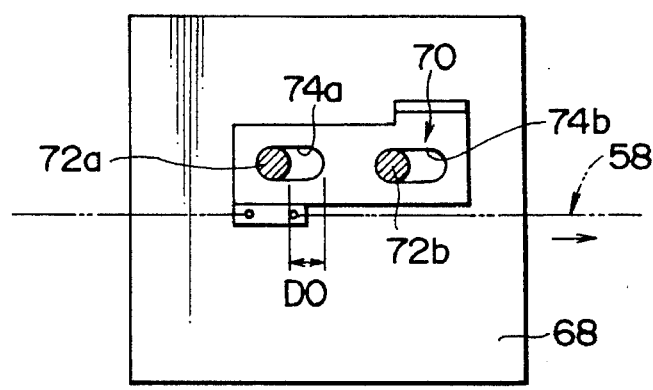
FIG. 7 is a front elevational view showing the connector and the attachment with the wire pulled to the right from the position shown in FIG. 6.

When the motor 50 is energized to rotate the motor shaft 50a counterclockwise in FIG. 1, the wire 58 is pulled rightward from the position shown in FIG. 6 in which the rods 72a, 72b are positioned centrally in the respective slots 74a, 74b, thereby moving the connector 70 to the right. The connector 70 continuously moves to the right until the left-hand ends of the slots 74a, 74b abut against the respective rods 72a, 72b, as shown in FIG. 7. During this time, the attachment 68 and hence the lens mount base 40 remain stationary. When the left-hand ends of the slots 74a, 74b contact the respective rods 72a, 72b, the attachment 68 and thus the lens mount base 40 start to move to the right upon further rightward movement of the wire 58.

Figure 8:
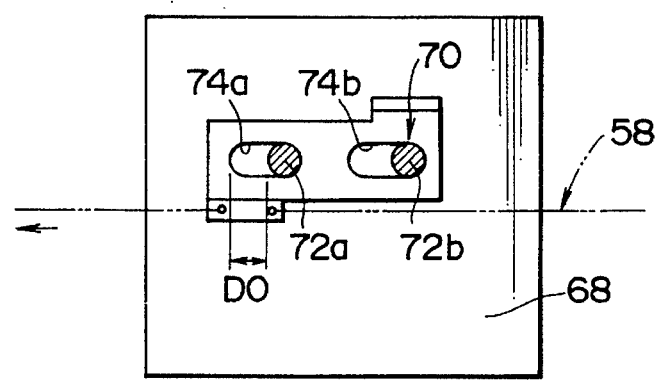
FIG. 8 is a front elevational view showing the connector and the attachment with the wire pulled to the left from the position shown in FIG. 6.

When the motor 50 is energized to rotate the motor shaft 50a clockwise in FIG. 1, the wire 58 is pulled leftward from the position shown in FIG. 6, thereby moving the connector 70 to the left. The connector 70 continuously moves to the left until the right-hand ends of the slots 74a, 74b contacts the respective rods 72a, 72b, as shown in FIG. 8. During this time, the attachment 68 and hence the lens mount base 40 remain at rest. When the right-hand ends of the slots 74a, 74b contact the respective rods 72a, 72b, the attachment 68 and hence the lens mount base 40 start to move to the left upon further leftward movement of the wire 58.

Figure 9:
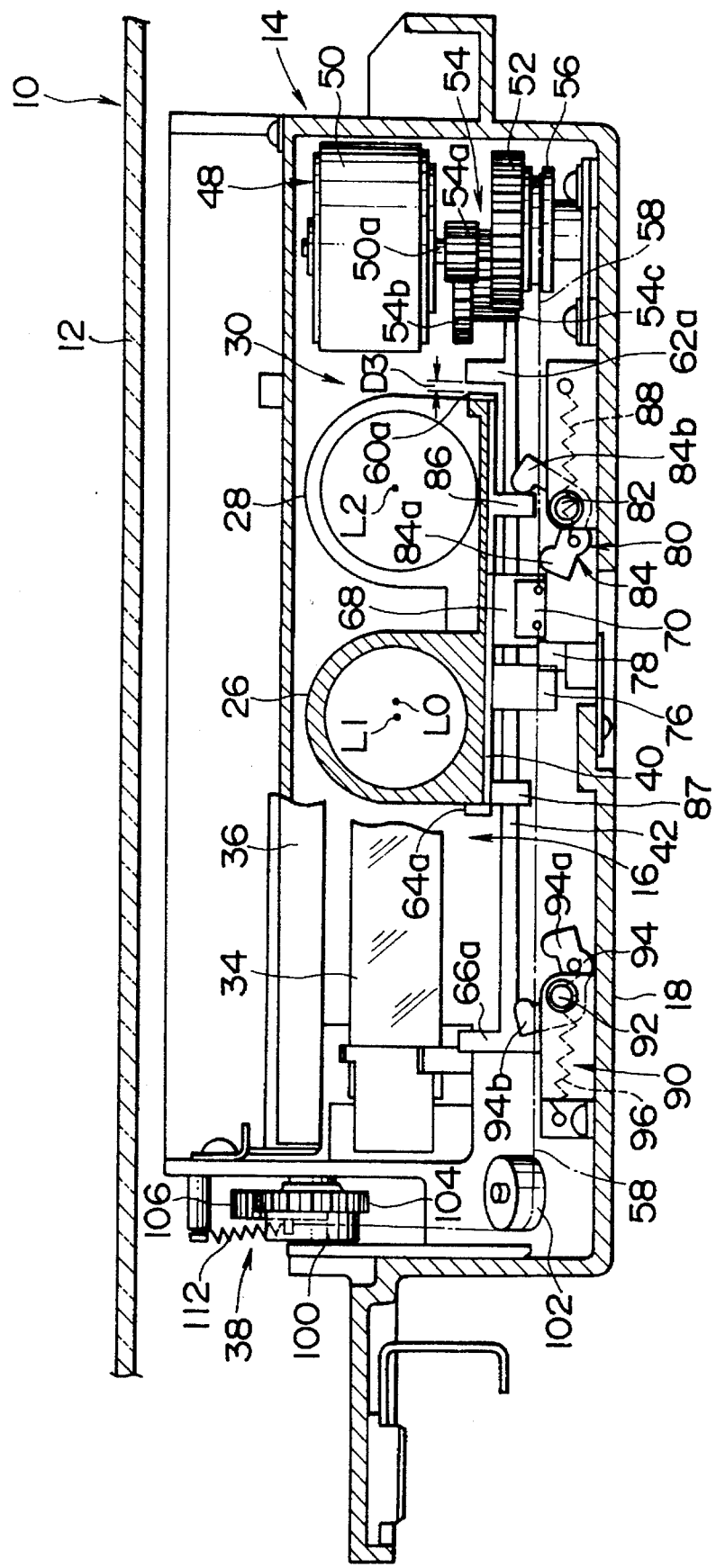
FIG. 9 is a sectional front elevational view of the internal structure of the image reading apparatus with the lens mount base immediately in front of the first position.

As shown in FIG. 3, a downwardly projecting trigger finger 76 is fixed to the lower surface of the lens mount base 40 for movement therewith. A proximity detector 78, which can be turned on when being approached by the trigger finger 76, is fixedly mounted on the lower panel of the housing 18. The trigger finger 76 and the proximity detector 78 are positioned such that the proximity detector 78 is turned on by the trigger finger 76 when the lens mount base 40 has moved rightward to a position that is spaced a distance D3 from the first position, as shown in FIG. 9, in which the first protrusions 60a, 60b abut against the respective first position lug stops 62a, 62b. The distance D3 and the distance D0 are related to each other as follows: D3 is approximately equal to D0/2.

The proximity detector 78 is electrically connected to a control unit 79 (see FIG. 3) which is in turn electrically connected to a rotary encoder 81 for detecting the angular displacement of the motor shaft 50a in order to detect the present position of the lens mount base 40. When the proximity detector 78 1s turned on by the trigger finger 76, the control unit 79 starts detecting a number of pulses from the rotary encoder 81 which correspond to a distance of about 1 mm from the position in which the trigger finger 76 has triggered the proximity detector 78. When the control unit 79 detects the number of pulses, it de-energizes the motor 50 to eliminate drive forces that have been applied to the lens mount base 40, which is now rendered free to move. The movable base is then moved to its final position by using a biasing mechanism.

A first biasing mechanism 80 (see FIG. 3) is positioned on the lower panel of the housing 18 for engaging the lens mount base 40 when the proximity detector 78 is turned on by the trigger finger 76. Without being assisted by the motor 50, the first biasing mechanism 80 can displace the lens mount base 40 to the right until the first protrusions 60a, 60b contact the first positioning stops 62a, 62b, respectively, thus moving the lens mount base 40 to the first position. The trigger finger 76 has a horizontal dimension such that once it has turned on the proximity detector 78, it keeps the proximity detector 78 turned on until the lens mount base 40 reaches the first position.

As shown in FIGS. 3 and 9, the first biasing mechanism 80 has a first toggle pusher 84 swingably supported on the lower panel of the housing 18 by a first support shaft 82 for angular movement about a horizontal axis parallel to the incident ray axis L0, i.e., perpendicular to the direction in which the lens mount base 40 is movable. The first toggle pusher 84 is of a substantially L shape as viewed in FIGS. 3 and 9, with the first support shaft 82 extending through the bent central corner thereof. The first toggle pusher 84 has a pushing arm 84a extending from one side of the central corner for engaging a left-hand vertical side surface of a downwardly extending bar 86 integrally fixed to the lower surface of the lens mount base 40 and pushing the lens mount base 40 rightward toward the first position, as shown in FIG. 3. The first toggle pusher 84 further includes a pushable arm 84b extending on the other side of the central corner at an angle to the pushing arm 84a for being engaged by a right-hand vertical side surface of the downwardly extending bar 86 and pushed rightward to turn clockwise about the first support shaft 82, as shown in FIG. 9.

The first biasing mechanism 80 also has a first coil spring 88 for forcing the first toggle pusher 84 to turn either clockwise or counterclockwise about the first support shaft 82, as viewed in FIGS. 3 and 9. The first coil spring 88 has one end connected to an intermediate portion of the pushing arm 84a and the other end to the lower panel of the housing 18, and is held under tension between its connected ends. Each time the axis of the first coil spring 88 moves across the axis of the first support shaft 82, i.e., moves past a neutral position, the first coil spring 88 forces the first toggle pusher 84 to snap into angular movement in a different direction. More specifically, when the axis of the first coil spring 88 is positioned above the axis of the first support shaft 82, the first coil spring 88 forces the first toggle pusher 84 to turn clockwise about the first support shaft 82, as shown in FIG. 3. When the axis of the first coil spring 88 is positioned below the axis of the first support shaft 82, the first coil spring 88 forces the first toggle pusher 84 to turn counterclockwise about the first support shaft 82, as shown in FIG. 9.

It is assumed that the first toggle pusher 84 is turned counterclockwise under the bias of the first coil spring 88 and resiliently kept in a pushable position, as shown in FIG. 9. When the lens mount base 40 is moved from the second position toward the first position, the bar 86 on the lens mount base 40 moves rightward over the pushing arm 84a into engagement with the left-hand side surface of the pushable arm 84b, as shown in FIG. 9. The instant the bar 86 engages the left-hand side surface of the pushable arm 84b, the proximity detector 78 is turned on by the trigger finger 76.

Continued movement of the lens mount base 40 to the right causes the bar 86 to push the arm 84b rightward. When the lens mount base 40 has moved rightward by a distance of about 1 mm from the position shown in FIG. 9, the first toggle pusher 84 is turned clockwise and the first coil spring 88 is angularly displaced upwardly. Thus the axis of the first coil spring 88 moves above the axis of the first support shaft 82, forcing the first toggle pusher 84 to turn clockwise under the resiliency of the first coil spring 88. Therefore, the first toggle pusher 84 is turned from a pressable position shown in FIG. 9 to a pushing position shown in FIG. 3 by the first coil spring 88.

When the first toggle pusher 84 is turned to the pushing position, the pushing arm 84a thereof now pushes the left-hand side surface of the bar 86 to the right. As described above, the motor 50 has been de-energized rendering the lens mount base 40 free to move after the lens mount base 40 moves about 1 mm rightward from the position shown in FIG. 9. Therefore, the first protrusions 60*a*, 60*b* of the lens mount base 40 resiliently abut against the respective first positioning stops 62*a*, 62*b* under the bias of the first coil spring 88. Stated otherwise, the lens mount base 40 is resiliently held in the first position by the first coil spring 88.

As described above, to bring the lens mount base 40 into the first position, the motor 50 is energized to move the lens mount base 40 until the bar 86 contacts the arm 84*b*. The proximity detector 78 is then turned on by the trigger finger 76. The motor 50 is then de-energized. The pusher 84 having been contacted by the bar 86 is turned clockwise. This brings the end of the spring 88, attached to the pusher 84, above the axis of support shaft 82. This results in the spring 88 forcing the arm 84*a* to further turn clockwise, pushing bar 86, and thus, base 40 further to the right until protrusions 60*a*, 60*b* contact positioning stops 62*a*, 62*b*. As a result, no undue load is imposed on the motor 50 and energy consumption by the motor 50 is reduced when lens mount base 40 is moved to the first position. In addition, the service life of the motor 50 is increased.

Figure 10:
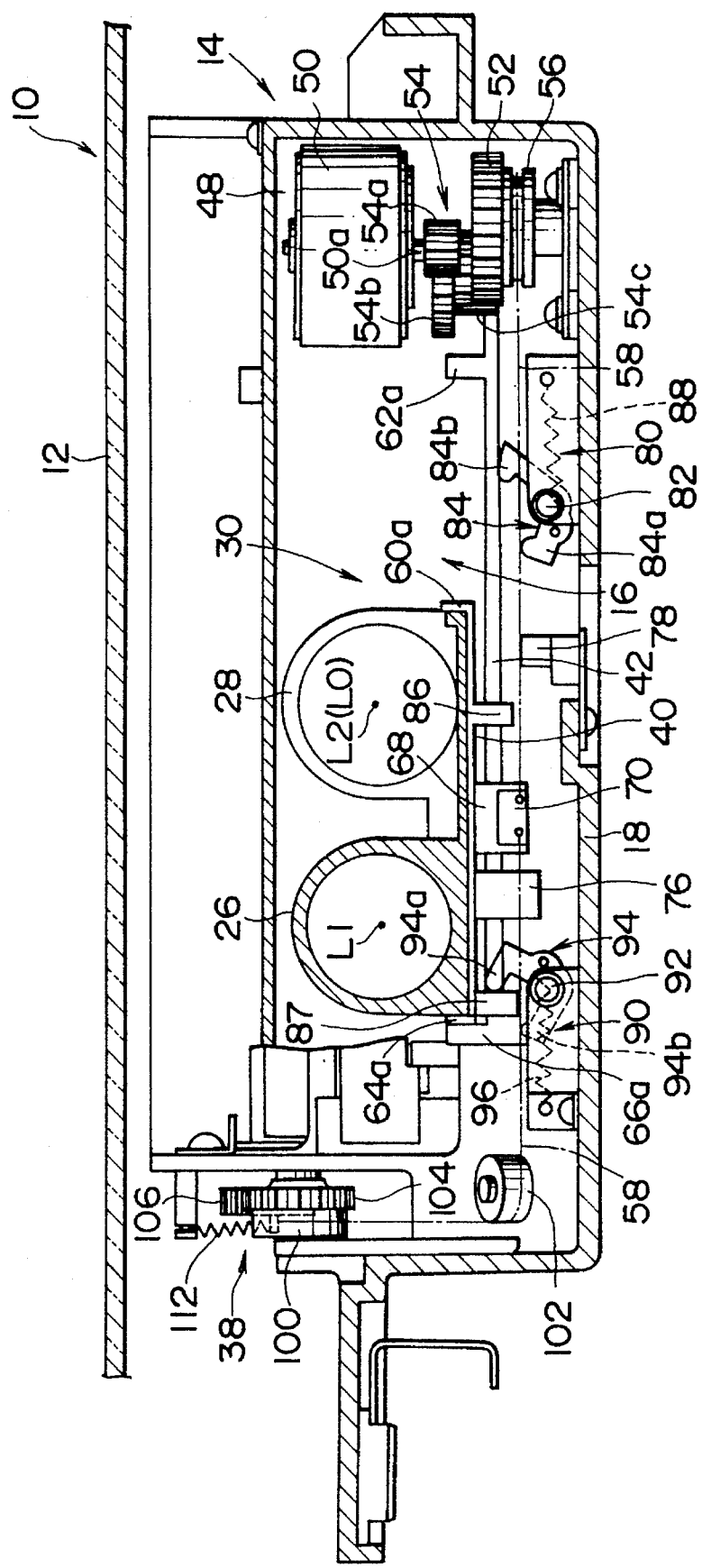
FIG. 10 is a sectional front elevational view of the internal structure of the image reading apparatus with the lens mount base in the second position.

In response to a switching signal to move the lens mount base 40 from the first position to the second position, the control unit 79 reverses the motor 50 to start moving the lens mount base 40 from the first position shown in FIG. 3 to the second position shown in FIG. 10. As the lens mount base 40 moves toward the second position, the bar 86 pushes the right-hand side surface of the pushing arm 84*a* to the left. Therefore, the first toggle pusher 84 is turned counterclockwise about the first support shaft 82 against the bias of the first coil spring 88. When the axis of the first coil spring 88 moves down below the axis of the first support shaft 82 upon counterclockwise turning movement of the first toggle pusher 84, the first toggle pusher 84 is toggled to turn counterclockwise under the bias of the first coil spring 88.

When the lens mount base 40 continuously moves to the left beyond the position shown in FIG. 9, the trigger finger 76 moves leftward away from the proximity detector 78, which is then turned off. When the proximity detector 78 is turned off, the control unit 79 resets the rotary encoder 81 to the position of the lens mount base 40 presently detected, i.e., the control unit 79 defines the position of the lens mount base 40 as its original position at the time the proximity detector 78 is turned off. In order to bring the lens mount base 40, as it moves toward the second position, accurately into a position immediately short of or in front of the second position shown in FIG. 10, i.e., a position shown in FIG. 11 that is spaced the distance D3 rightward from the second position, the position of the lens mount base 40 is detected on the basis of the number of pulses that are generated by the rotary encoder 81 after the lens mount base 40 has left the original position. Since the rotary encoder 81 is reset to the original position of the lens mount base 40 each time the lens mount base 40 moves from the first position toward the second position, the position immediately in front of the second position shown in FIG. 11 can be accurately detected at all times, and hence no detection errors are accumulated in detecting that position.

Figure 11:
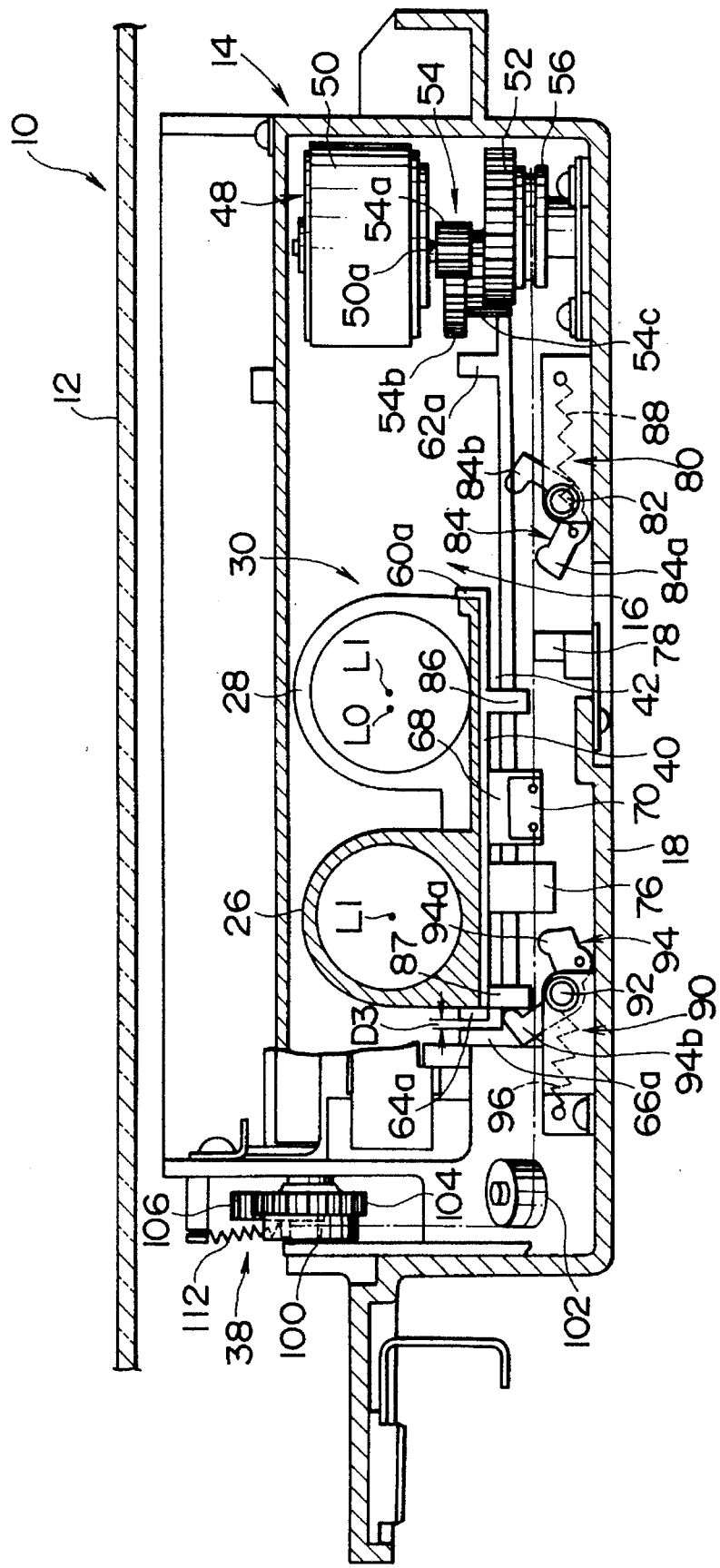
FIG. 11 is a sectional front elevational view of the internal structure of the image reading apparatus with the lens mount base immediately in front of the second position.
Figure 12:
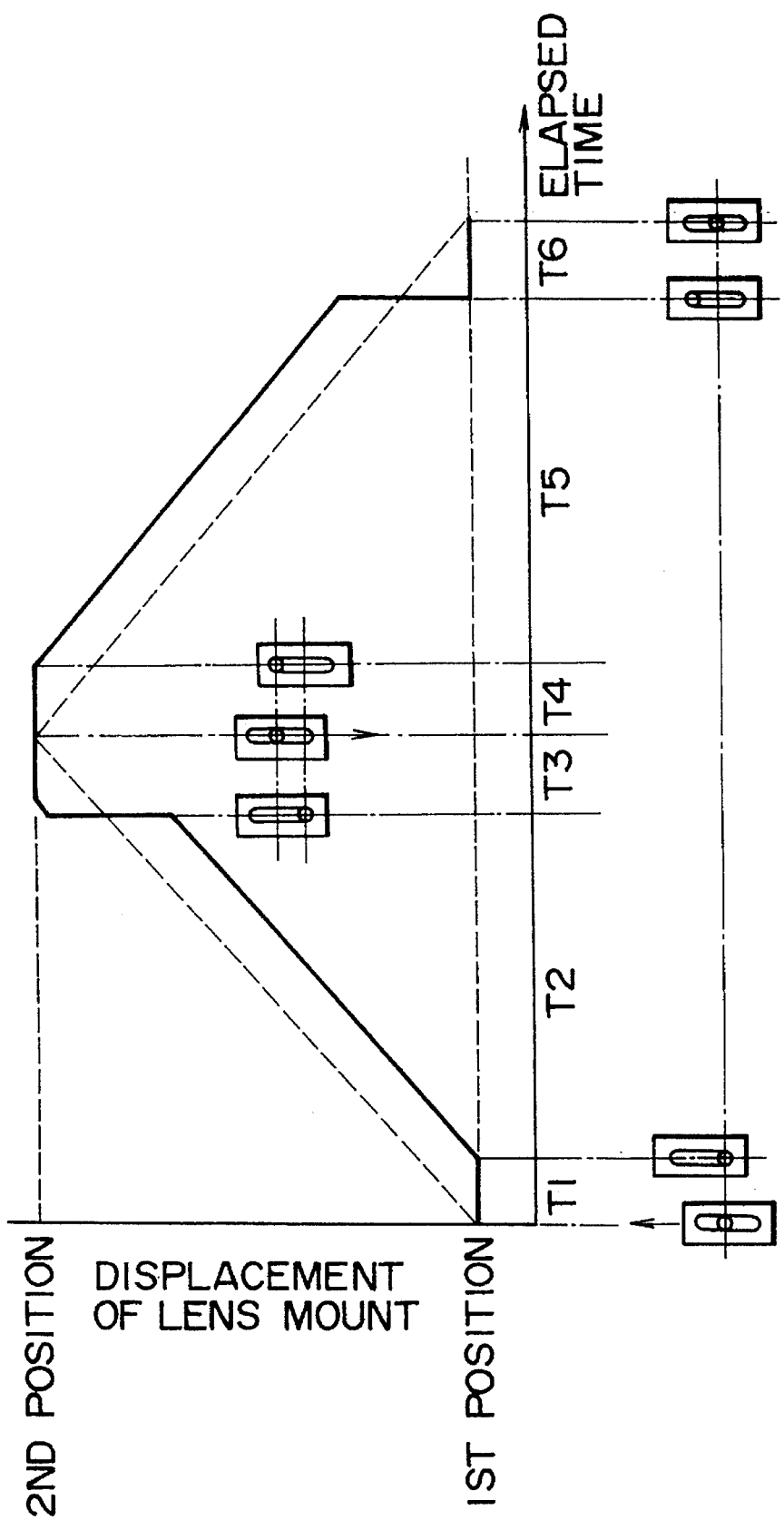
FIG. 12 is a diagram showing the manner in which the lens mount base moves as the wire is actuated and first and second biasing mechanisms are actuated.

A second biasing mechanism 90, similar to the first biasing mechanism 80, is positioned on the lower panel of the housing 18 for engaging the lens mount base 40 when the lens mount base 40 reaches the position shown in FIG. 11 that is spaced the distance D3 from the second position toward the first position, as detected by the control unit 79 based on the number of pulses generated by the rotary encoder 81. Upon detection of further movement of the lens mount base 40 from the position shown in FIG. 11 toward the second position over a distance of about 1 mm, the control unit 79 de-energizes the motor 50 rendering the lens mount base 40 free to move. When the lens mount base 40 has thus moved about 1 mm from the position shown in FIG. 11 toward the second position, the second biasing mechanism 90 can displace the lens mount base 40 to the left until the second protrusions 64*a*, 64*b* contact the second positioning stops 66*a*, 66*b*, respectively, thus moving the lens mount base 40 to the second position without being assisted by the motor 50.

As shown in FIGS. 10 and 11, the second biasing mechanism 90 has a second toggle pusher 94 swingably supported on the lower panel of the housing 18 by a second support shaft 92 for angular movement about a horizontal axis parallel to the incident ray axis L0, i.e., perpendicular to the direction in which the lens mount base 40 is movable. The second toggle pusher 94 is of a substantially L shape as viewed in FIGS. 10 and 11, with the first support shaft 82 extending through the bent central corner thereof. The second toggle pusher 94 has a pushing arm 94*a* extending on one side of the central corner for engaging a right-hand vertical side surface of a downwardly extending bar 87 integrally fixed to the lower surface of the lens mount base 40 and pushing the lens mount base 40 leftward toward the second position, as shown in FIG. 10. The second toggle pusher 94 further includes a pushable arm 94*b* extending on the other side of the central corner at an angle to the pushing arm 94*a* for being engaged by the left-hand vertical side surface of the bar 87 and pushed leftward to turn counterclockwise about the second support shaft 92, as shown in FIG. 11.

The second biasing mechanism 90 also has a second coil spring 96 for forcing the second toggle pusher 94 to turn either clockwise or counterclockwise about the second support shaft 92, as viewed in FIGS. 10 and 11.

The second coil spring 96 has one end connected to an intermediate portion of the pushing arm 94*a* and the other end to the lower panel of the housing 18, and is held under tension between its connected ends. Each time the axis of the second coil spring 96 moves across the axis of the second support shaft 92, i.e., moves past a neutral position, the second coil spring 96 forces the second toggle pusher 94 to move in the opposite direction. More specifically, when the axis of the second coil spring 96 is positioned above the axis of the second support shaft 92, the second coil spring 96 forces the second toggle pusher 94 to turn counterclockwise about the second support shaft 92, as shown in FIG. 10. When the axis of the second coil spring 96 is positioned below the axis of the second support shaft 92, the second coil spring 96 forces the second toggle pusher 94 to turn clockwise about the second support shaft 92, as shown in FIG. 11.

It is assumed that the second toggle pusher 94 is turned clockwise under the bias of the second coil spring 96 and resiliently kept in a pushable position, as shown in FIG. 11. When the lens mount base 40 is moved from the first position toward the second position, the bar 87 on the lens mount base 40 moves leftward over the pushing arm 94*a* into engagement with the right-hand side surface of the pushable arm 94*b*, as shown in FIG. 11. When the lens mount base 40 moves leftward toward the second position by a distance of about 1 mm after the bar 87 has engaged the pressable arm 94*b*, the bar 87 further pushes the pressable arm 94*b* to the left, the second toggle pusher 94 is turned counterclockwise and the second coil spring 96 is angularly displaced upwardly until its axis moves across the axis of the second support shaft 92.

Now, the second toggle pusher 94 is toggled to turn counterclockwise under the resiliency of the second coil spring 96. Therefore, the second toggle pusher 94 is turned from a pressable position shown in FIG. 11 to a pushing position shown in FIG. 10 by the second coil spring 96. When the second toggle pusher 94 is turned to the pushing position, the pushing arm 94a thereof now pushes the right-hand side surface of the bar 87 to the left. As described above, the motor 50 has been de-energized rendering the lens mount base 40 free to move after the lens mount base 40 moved about 1 mm leftward from the position shown in FIG. 11. Therefore, the second protrusions 64a, 64b of the lens mount base 40 resiliently contact the second positioning stops 66a, 66b respectively, under the bias of the second coil spring 96. Stated otherwise, the lens mount base 40 is resiliently held in the second position by the second coil spring 96.

As described above, the lens mount base 40 is brought into the second position by de-energizing the motor 50 immediately before the second protrusions 64a, 64b contact the second positioning stops 66a, 66b, respectively, making the lens mount base 40 free to move, and then biasing the second protrusions 64a, 64b to resiliently contact the second positioning stops 66a, 66b respectively under the force of the second coil spring 96. As a result, the motor 50 is subject to no undue load and consumes a reduced amount of energy when the lens mount base 40 is brought and held in the second position. Furthermore, the motor 50 has an increased service life.

In response to a switching signal to move the lens mount base 40 from the second position to the first position, the control unit 79 reverses the motor 50 again, i.e., rotates the motor 50 in its normal direction, so as to start moving the lens mount base 40 from the second position shown in FIG. 10 to the first position shown in FIG. 3. As the lens mount base 40 moves toward the first position, the bar 87 pushes the left-hand side surface of the pushing arm 94a to the right. Therefore, the second toggle pusher 94 is turned clockwise about the second support shaft 92 against the bias of the second coil spring 96. When the axis of the second coil spring 96 moves down below the axis of the second support shaft 92 upon clockwise turning movement of the second toggle pusher 94, the second toggle pusher 94 is toggled to turn clockwise under the bias of the second coil spring 96.

The lens mount base 40 continuously moves rightward beyond the position shown in FIG. 11, and then the position shown in FIG. 9, into the first position shown in FIG. 3.

Operation of the actuator mechanism 48 of the magnification switching mechanism 30 will be described below with reference to FIGS. 6 through 8 and 12.

When the lens mount base 40 is in the first position, i.e., when the first fixed-focus lens group 26 is selected for its first magnifying power with its optical axis L1 aligned with the incident ray axis L0, the rods 72a, 72b are positioned substantially centrally in the respective slots 74a, 74b, as shown in FIG. 6. The control unit 79 energizes the motor 50 to rotate the motor shaft 50a clockwise (FIG. 1) to start moving the wire 58 leftward through the speed reduction mechanism 54. During an initial period T1 shown in FIG. 12, the rods 72a, 72b are allowed to move in the respective slots 74a, 74b in the connector 70 that is connected to the wire 58. Therefore, only the connector 70 moves to the left, and the lens mount base 40 remains in the first position.

When the right-hand ends of the slots 74a, 74b contact the rods 72a, 72b respectively, as shown in FIG. 8, the lens mount base 40 starts to move leftward from the first position toward the second position as the wire 58 is pulled to the left. The lens mount base 40 continuously moves leftward during a period T2 (FIG. 12) until it reaches the position shown in FIG. 11. Upon passage of the lens mount base 40 through the position shown in FIG. 9, the position of the lens mount base 40 as detected, based on pulses from the rotary encoder 81, is reset as its original position in the control unit 79.

Upon arrival of the lens mount base 40 at the position shown in FIG. 11, the pressable arm 94b of the second toggle pusher 94 is engaged by the bar 87 on the lens mount base 40. While the lens mount base 40 is subsequently moving about 1 mm toward the position shown in FIG. 10, the second toggle pusher 94 Is turned counterclockwise, and the lens mount base 40 is forced to move toward the second position under the bias of the second coil spring 96 and the motor 50 is de-energized. After the lens mount base 40 has moved about 1 mm from the position shown in FIG. 11, the lens mount base 40 is displaced into the second position shown in FIG. 10 by the second biasing mechanism 90 for a period T3 shown in FIG. 12.

During the period T3, no force is applied to pull the wire 58 to the left as the motor 50 is de-energized. Since the lens mount base 40 is displaced into the second position directly by the second biasing mechanism 90, the rods 72a, 72b are moved leftward relatively in the respective slots 74a, 74b. Consequently, the rods 72a, 72b are moved from the positlon in which they are held against the right-hand ends of the slots 74a, 74b respectively as shown in FIG. 8, to approximately the central positions in the slots 74a, 74b. After the lens mount base 40 has arrived at the second position shown in FIG. 10, the lens mount base 40 is resiliently maintained in the second position under the bias of the second biasing mechanism 90. At this time, the second fixed-focus lens group 28 is selected for its second magnifying power with its optical axis L2 aligned with the incident ray axis L0.

When the control unit 79 energizes the motor 50 to rotate the motor shaft 50a counterclockwise (FIG. 1) with the lens mount base 40 in the second position shown in FIG. 10, the motor shaft 50a starts moving the wire 58 rightward through the speed reduction mechanism 54. During a period T4 shown in FIG. 12, the rods 72a, 72b are allowed to move in the slots 74a, 74b, respectively, in the connector 70 that is connected to the wire 58. Therefore, only the connector 70 moves to the right, and the lens mount base 40 remains in the second position.

When the left-hand ends of the slots 74a, 74b contact the rods 72a, 72b, respectively, as shown in FIG. 7, the lens mount base 40 starts to move rightward from the second position toward the first position as the wire 58 is pulled to the right. The lens mount base 40 continuously moves rightward during a period T5 (FIG. 12) until it reaches the position shown in FIG. 9.

Upon arrival of the lens mount base 40 at the position shown in FIG. 9, the bar 86 on the lens mount base 40 engages the pressable arm 84b of the first toggle pusher 84. While the lens mount base 40 is subsequently moving about 1 mm toward the first position shown in FIG. 3, the second toggle pusher 84 is turned clockwise, and the lens mount base 40 is forced to move toward the first position under the bias of the first coil spring 88 and the motor 50 is de-energized. After the lens mount base 40 has moved about 1 mm from the position shown in FIG. 9, the lens mount base 40 is displaced into the first position shown in FIG. 3 by the first biasing mechanism 80 for a period T6 shown in FIG. 12.

During the period T6, no force is applied to pull the wire 58 to the right as the motor 50 is de-energized. Since the lens mount base 40 is displaced into the first position directly by the first biasing mechanism 80, the rods 72a, 72b are moved rightward in the slots 74a, 74b respectively. Consequently, the rods 72a, 72b are moved from the position in which they are held against the left-hand ends of the slots 74a, 74b, respectively, as shown in FIG. 7 to approximately the respective central positions in the slots 74a, 74b. After the lens mount base 40 has arrived at the first position shown in FIG. 3, the lens mount base 40 is resiliently maintained in the first position under the bias of the first biasing mechanism 80. At this time, the first fixed-focus lens group 26 is selected for its first magnifying power with its optical axis L1 aligned with the incident ray axis L0.

As described above, the lens mount base 40 is moved to the first position by biasing the first protrusions 60a, 60b to contact the first positioning stops 62a, 62b respectively with the first biasing mechanism 80. Similarly the lens mount base 40 is moved to the second position by biasing the second protrusions 64a, 64b to contact the second positioning stops 66a, 66b respectively with the second biasing mechanism 90. To allow the lens mount base 40 to traverse the final distance D3 with the first and second biasing mechanisms 80, 90 before it reaches the first and second positions, respectively, the connector 70, connected to the wire 58 and movable thereby, and the attachment 68, secured to the lens mount base 40, are coupled to each other through the rods 72a, 72b which are loosely fitted into the slots 74a, 74b respectively such that the connector 70 can be moved over the distance D3 relative to the attachment 68.

Furthermore, even when the power supply of the image reading apparatus 10 is switched off, the lens mount base 40 is resiliently held in the first and second positions by the first and second biasing mechanisms 80, 90, respectively. As a consequence, the lens mount base 40 is stably kept in the first or second position without undesired displacements even when the image reading apparatus 10 is moved with the power supply turned off.

The turning mechanism 38 for turning the movable reflecting mirror 36 between the upper and lower positions in synchronism with magnification switching operation of the magnification switching mechanism 30 will be described in detail below with reference to FIG. 1 and 13 through 18.

As shown in FIG. 1, the wire 58 for transmitting the drive forces from the motor 50 extends rightward from its end connected to the right-hand end of the connector 70 along the direction in which the lens mount base 40 is movable, is guided around the output pulley 56, and then extends leftward along the direction in which the lens mount base 40 is movable. Then, the wire 58 is guided around a first idler pulley 98, directed rearward parallel to the incident ray axis L0, guided around a driven pulley 100 of the turning mechanism 38, directed forward parallel to the incident ray axis L0, guided around a second idler pulley 102, and directed to extend along the direction in which the lens mount base 40 is movable, with the opposite end connected to the left-hand end of the connector 70.

The first and second idler pulleys 98, 102 are rotatably mounted on the lower panel of the housing 18. The driven pulley 100 is rotatably mounted on the outer surface of a side panel of the housing 18 near an end of the movable reflecting mirror 36 for rotation about an axis parallel to the direction in which the lens mount base 40 is movable. The portion of the wire 58 which is guided around the driven pulley 100 and extends between the first and second idler pulleys 98, 102 extends into and out of the housing 18 through an opening defined in the side panel thereof. The actuator mechanism 48 of the magnification switching mechanism 30 and the turning mechanism 38 are coupled to each other by the wire 58 such that the turning mechanism 38 can angularly move the movable reflecting mirror 36 in synchronism with the movement of the lens mount base 40, which is by the actuator mechanism 48.

Figure 13:
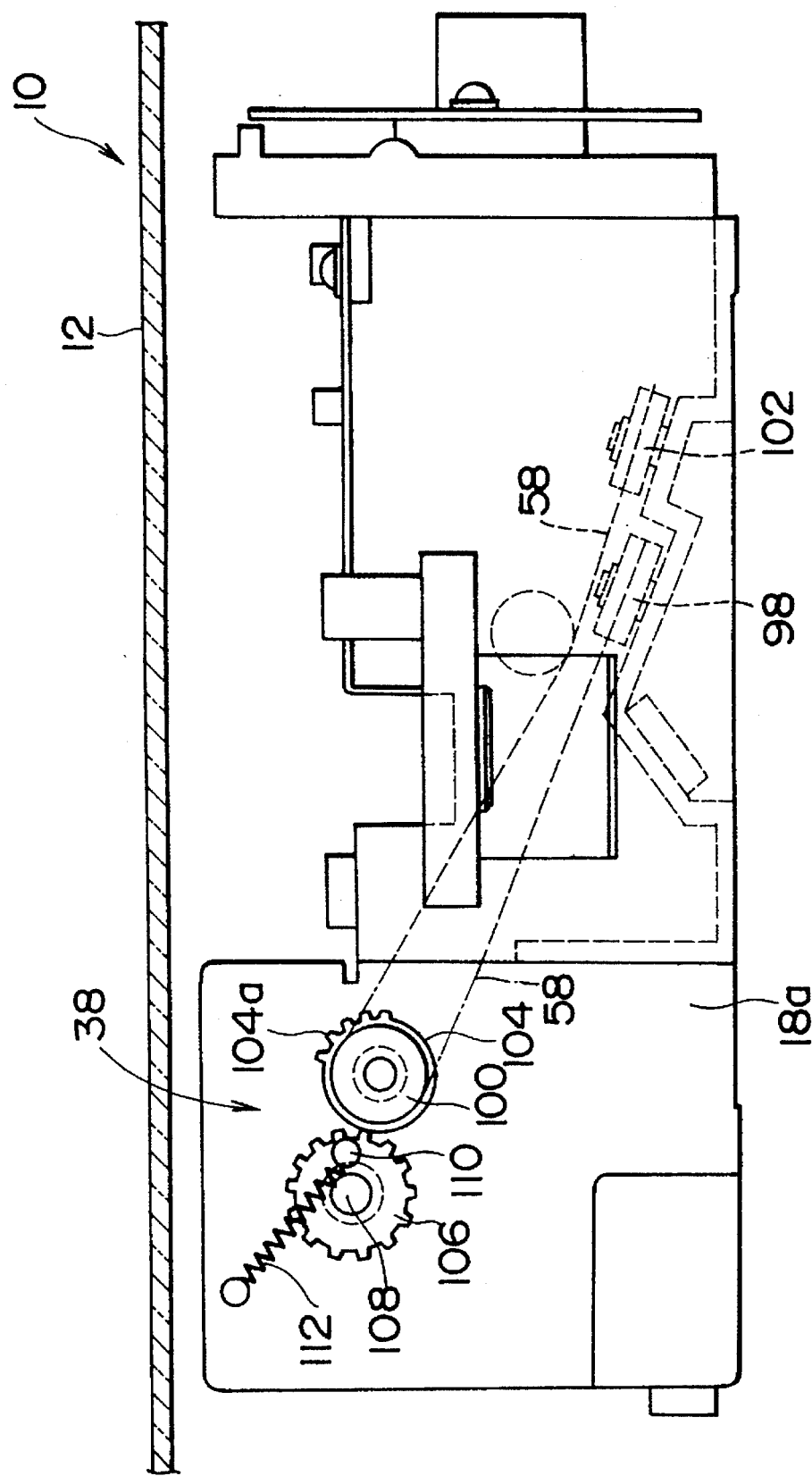
FIG. 13 is a side elevational view of a turning mechanism.

As shown in FIG. 13, the turning mechanism 38 includes, in addition to the driven pulley 100, an intermittent gear 104 positioned axially inwardly of and fixed integrally with the driven pulley 100, a driven gear 106 disposed to mesh with the gear teeth 104a of the intermittent gear 104, and a support shaft 108 by which the driven gear 106 is rotatably supported on the outer surface of the side panel of the housing 18 for rotation about an axis parallel to the axis of the intermittent gear 104. The turning mechanism further includes a pin 110 mounted on an outer side surface of the driven gear 106 in radially offset relationship to the axis of the driven gear 106, and a third coil spring 112 having one end connected to the pin 110 and the other end to the outer surface of the side panel of the housing 18 and kept under tension for normally forcing the driven gear 106 to turn about its own axis. The support shaft 108 extends through the side panel of the housing 108 and is integrally coupled to the end of the movable reflecting mirror 36.

Figure 14:
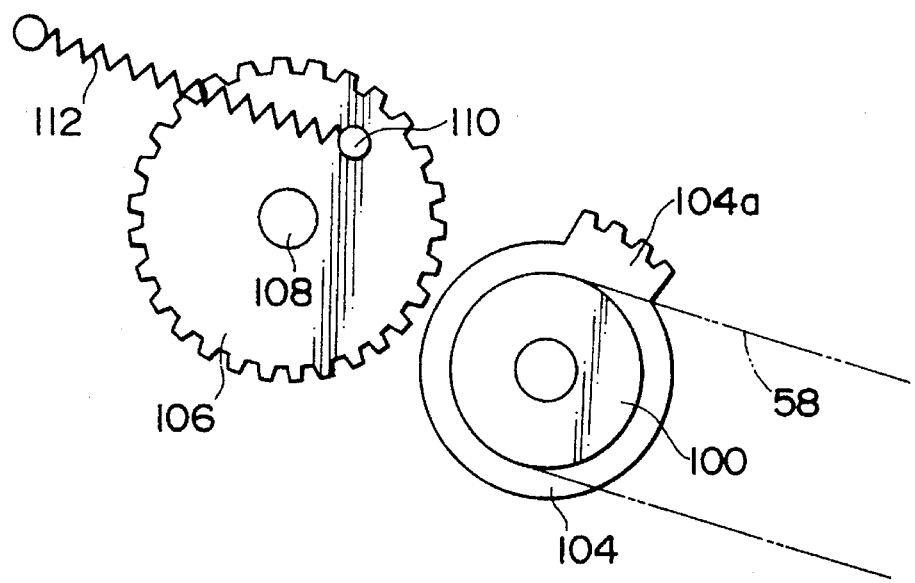
FIG. 14 is a side elevational view of an intermittent gear which is in an angularly upwardly displaced position and a driven gear which is in an angularly downwardly biased position.

Each time the axls of the third coil spring 112 moves across the axis of the support shaft 108, i.e., moves past a neutral position, the third coil spring 108 forces the driven gear 106 to move in the opposite direction. More specifically, when the axis of the third coil spring 112 is positioned up above the axis of the support shaft 108, the third coil spring 112 forces the driven gear 106 to turn counterclockwise about the support shaft 108 into an upwardly biased position, as shown in FIG. 14. When the axis of the third coil spring 112 moves down below the axis of the support shaft 108 as shown in FIG. 15 and is positioned as shown in FIG. 16, the third coil spring 112 forces the driven gear 106 to turn clockwise about the support shaft 108 to a downwardly biased position, as shown in FIG. 16.

The counterclockwise angular movement of the driven gear 106, under the bias of the third coil spring 112, is automatically stopped when the movable reflecting mirror 36, coupled to the driven gear 106, is engaged by an upper stopper 114 (see FIG. 2) mounted in the housing 18. The clockwise angular movement of the driven gear 106, under the bias of the third coil spring 112, is automatically stopped when the movable reflecting mirror 36, coupled to the driven gear 106, is engaged by a lower stopper 116 (see FIG. 5) mounted in the housing 18.

The gear teeth 104a of the intermittent gear 104 are arranged such that they are angularly displaced upwardly far out of mesh with the driven gear 106, as shown in FIG. 14, when the lens mount base 40 is positioned in the first position selecting the first fixed-focus lens group 26 for the first magnifying power with the magnification switching mechanism 30. The gear teeth 104a are angularly displaced downwardly far out of mesh with the driven gear 106, as shown in FIG. 16, when the lens mount base 40 is positioned in the second position selecting the second fixed-focus lens group 28 for the second magnifying power with the magnification switching mechanism 30. The gear teeth 104a extend in a circumferential range that is large enough to keep the gear teeth 104a in mesh with the driven gear 106 and to displace the axls of the third coil spring 112 across the axis of the support shaft 108 from one side thereof to the other, upon rotation of the intermittent gear 104 while the lens mount base 40 is being moved from the first position to the second position or vice versa by the magnification switching mechanism 30.

Figure 15:
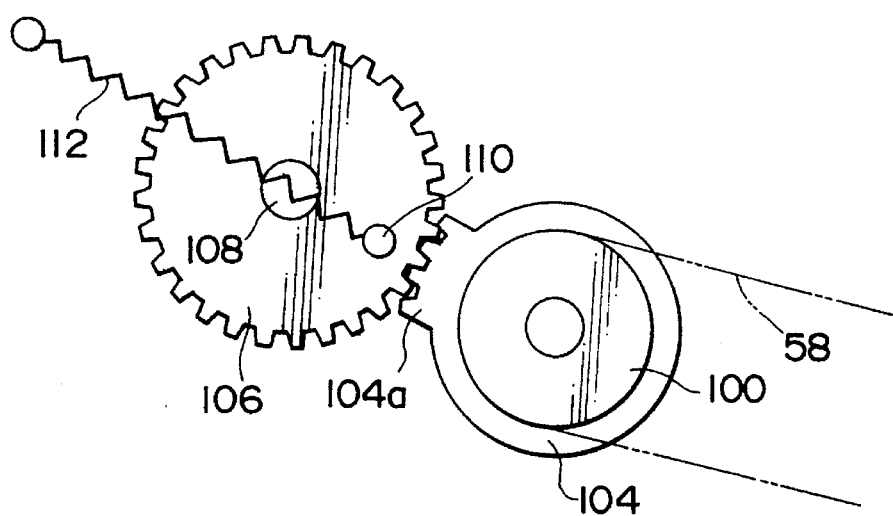
FIG. 15 is a side elevational view of the intermittent gear as it is turned into mesh with the driven gear, causing a third coil spring coupled to the driven gear to displace its axis across the axis of rotation of the driven gear.
Figure 16:
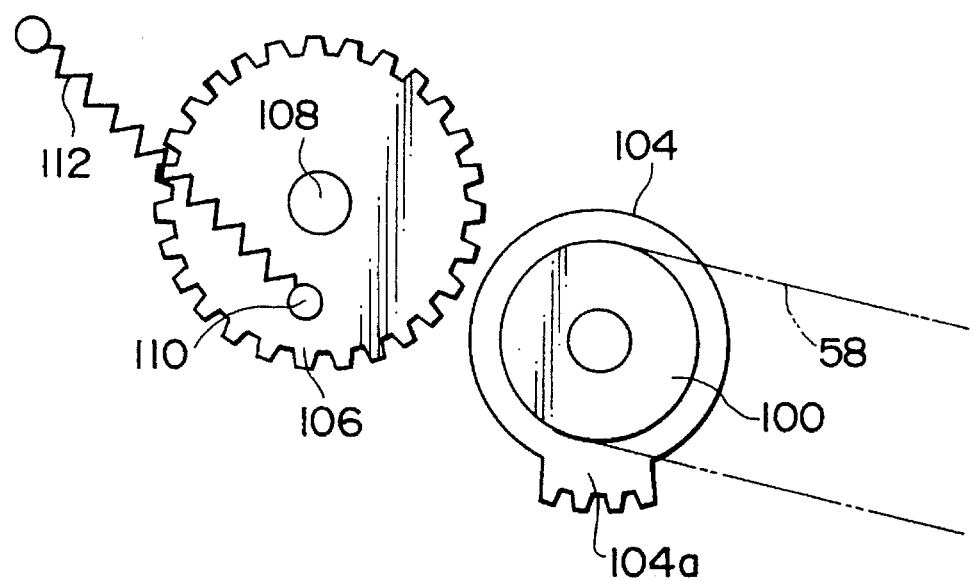
FIG. 16 is a side elevational view of the intermittent gear which is in an angularly downwardly displaced position and the driven gear which is in an angularly upwardly biased position.

As the lens mount base 40 is moved from the first position to the second position for the magnification switching mechanism 30 to switch from the first magnifying power to the second magnifying power, the intermittent gear 104 is turned counterclockwise from an upwardly displaced position shown in FIG. 14 through the neutral position shown in FIG. 15 to a downwardly displaced position shown in FIG. 16. Before the intermittent gear 104 is turned to the neutral position shown in FIG. 15, the driven gear 106 is held in the upwardly biased position under the bias of the third coil spring 112, as shown in FIG. 14. Upon passing through the neutral positlon shown in FIG. 15, the gear teeth 104a mesh with the driven gear 106, turning the driven gear 106 clockwise against the bias of the third coil spring 112. As a result, as the driven gear 106 is turned clockwise, the axis of the third coil spring 112 moves down below the axls of the support shaft 108. Further counterclockwise angular movement of the intermittent gear 104 brings the gear teeth 104a out of mesh with the driven gear 106. At this time, the driven gear 106 is toggled to turn clockwise into the downwardly biased position under the bias of the third coil spring 112.

As the lens mount base 40 is moved from the second position to the first position for the magnification switching mechanism 30 to switch from the second magnifying power to the first magnifying power, the intermittent gear 104 is turned clockwise from the downwardly displaced position shown in FIG. 16 through the neutral position shown in FIG. 15 to the upwardly displaced position shown in FIG. 14. Before the intermittent gear 104 is turned to the neutral position shown in FIG. 15, the driven gear 106 is held in the downwardly biased position under the bias of the third coil spring 112, as shown in FIG. 16. Upon passing through the neutral position shown in FIG. 15, the gear teeth 104a mesh with the driven gear 106, turning the driven gear 106 counterclockwise against the bias of the third coil spring 112. As a result, as the driven gear 106 is turned counterclockwise, the axis of the third coil spring 112 moves up above the axis of the support shaft 108. Further clockwise angular movement of the intermittent gear 104 brings the gear teeth 104a out of mesh with the driven gear 106. At this time, the driven gear 106 is toggled to turn counterclockwise into the upwardly biased position under the bias of the third coil spring 112.

As described above, the final action to move the driven gear 106 to the upwardly or downwardly biased positions, in order to move the movable reflecting mirror 36 to the upper or lower position, is achieved by the third coil spring 112 which resiliently brings and holds the driven gear 106 in the upwardly or downwardly biased position. As a consequence, no drive forces are transmitted through the wire 58 to move the driven gear 106 to the upwardly or downwardly biased position, and thus, the driven gear 106 can be moved reliably to the upwardly or downwardly biased position under the bias of the third coil spring 112.

Even though the driven gear 106 is resiliently held in the upwardly or downwardly biased position by the third coil spring 112, the movable reflecting mirror 36 is not securely held in the upper or lower position by meshing gears or the like. Accordingly, if the image reading apparatus 10 undergoes shocks or violent vibrations during shipment thereof, then the movable reflecting mirror 36, which may happen to be in the upper position, would tend to turn to the lower position against the bias of the third coil spring 112. If the movable reflecting mirror 36 turned to the lower position regardless of the lens mount base 40 being held in the first position selecting the first magnifying power, the length of the optical path from the document on the platen 12 to the first fixed-focus lens group 26 would vary, causing the image on the line sensor 24 to be defocused. According to the present invention, once the movable reflecting mirror 36 has been turned to the upper position, it is prevented by a retaining mechanism 118 from turning from the upper position to the lower position unless the intermittent gear 104 is actuated to cause the driven gear 106 to turn the movable reflecting mirror 36 from the upper position to the lower position.

The retaining mechanism 118 will be described in detail below with reference to FIGS. 17 and 18.

Figure 17:
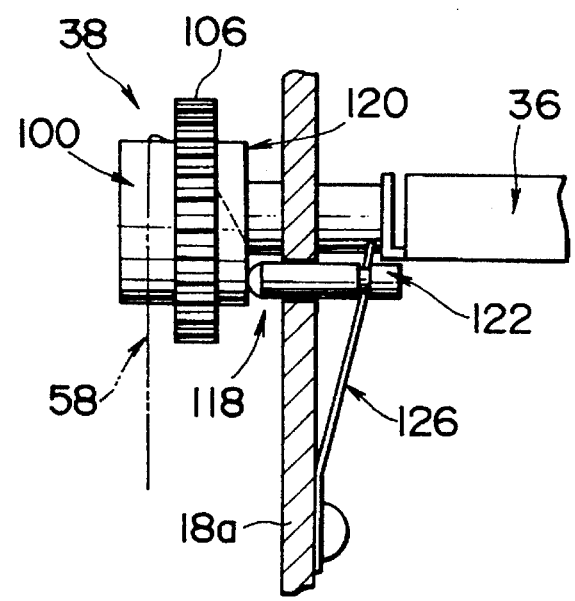
FIG. 17 is a sectional front elevational view of a retaining mechanism combined with the turning mechanism.

As shown in FIG. 17, the retaining mechanism 118 comprises a cam 120 integrally coupled to an inner side surface of the driven gear 106, an engaging pin 122 disposed as a cam follower contacting the cam 120 directly below the movable mirror 36 that is located in the upper position, the engaging pin 122 being axially movably supported on and extending transversely through a side panel 18a of the housing 18, and a leaf spring 126 joined to the side panel 18a for normally forcing the engaging pin 122 in a direction to engage an inner cam surface 124 (see FIG. 18) of the cam 120. The engaging pin 122 has an outer end (i.e., the left end as shown), projecting outwardly of the side panel 18a and an inner end (the right end as shown), projecting into the side panel 18a. The engaging pin 122 is axially movable by the cam 120 between an engaging position in which the inner end of the engaging pin 122 is positioned in a mirror movement range 36a, shown hatched in FIG. 18, in which the movable reflecting mirror 36 is angularly movable, thus engaging the movable reflecting mirror 36 in the upper position against angular movement thereof toward the lower position, and a retracted position in which the engaging pin 122 is positioned out of the mirror movement range 36a allowing the movable reflecting mirror 36 to angularly move from the upper position toward the lower position.

Figure 18:
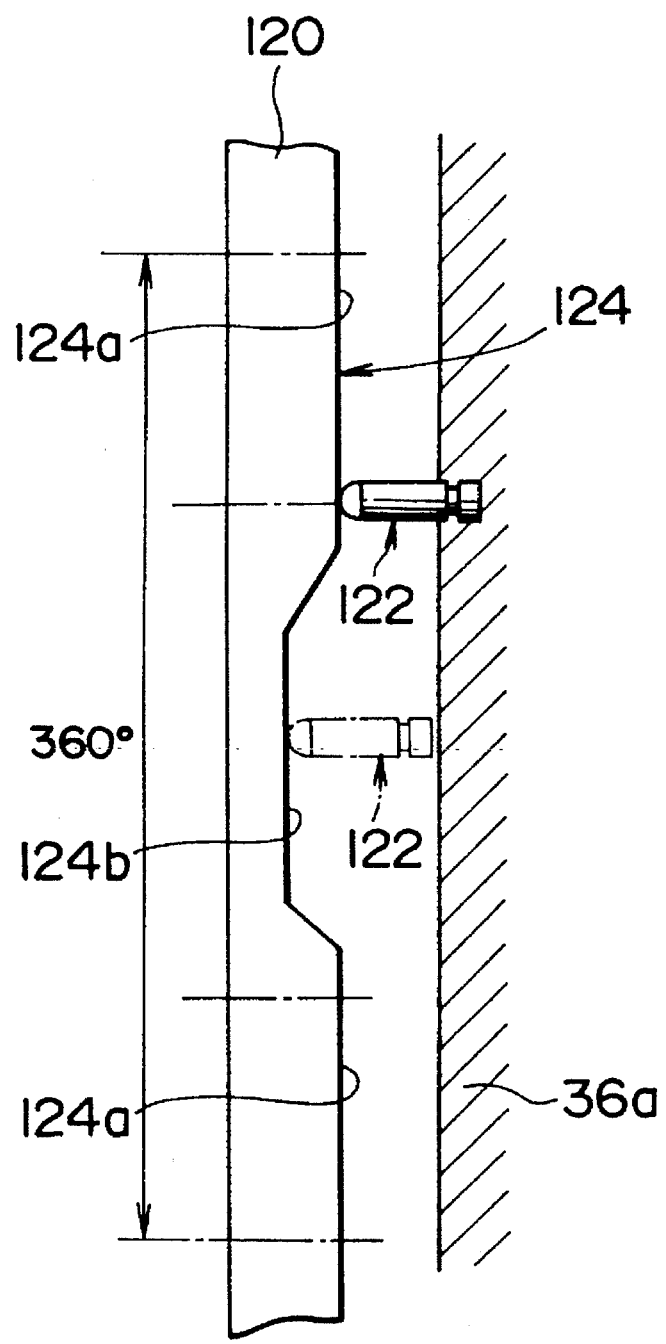
FIG. 18 is a fragmentary view of a developed cam profile of a cam member of the turning mechanism.

As shown in FIG. 18, the cam surface 124 includes a first cam surface portion 124a for engaging the outer end of the engaging pin 122 to displace the engaging pin 122 into the engaging position thereby locating the inner end thereof in the mirror movement range 36a, and a second cam surface portion 124b positioned outwardly from the first cam surface portion 124a toward an outer side surface of the driven gear 106 for engaging the outer end of the engaging pin 122 to displace the engaging pin 122 into the retracted position thereby locating the inner end thereof out of the mirror movement range 36a. The first and second cam surface portions 124a, 124b are relatively positioned such that the first cam surface portion 124a engages the engaging pin 122 when the driven gear 106 is located at or near the upwardly or downwardly biased position, and the second cam surface portion 124b engages the engaging pin 122 when the driven gear 106 is between the upwardly and downwardly biased positions.

Therefore, when the driven gear 106 is in the upwardly biased position as shown in FIG. 14, the first cam surface portion 124a engages the engaging pin 122, pushing it into the engaging position as indicated by the solid lines in FIG. 18. As a result, the movable reflecting mirror 36 which is in the upwardly biased position is prevented by the engaging pin 122 from being moved toward the lower position and is retained in the upper position even when the driven gear 106 is held out of mesh with the gear teeth 104a of the intermittent gear 104.

When the driven gear 106 is not in the upwardly or downwardly biased position as shown in FIG. 15, the second cam surface portion 124b engages the engaging pin 122, allowing it into the retracted position as indicated by the dot-and-dash lines in FIG. 18. As a result, the movable reflecting mirror 36, which was at the upper position, is allowed to angularly move toward the lower position as the driven gear 106 is turned from the upwardly biased position toward the downwardly biased position. Similarly, the movable reflecting mirror 36 which at the lower position is allowed to angularly move toward the upper position as the driven gear 106 is turned from the downwardly biased position toward the upwardly biased position.

When the driven gear 106 is in the downwardly biased position, as shown in FIG. 16, the first cam surface portion 124a engages the engaging pin 122, bringing the engaging pin 122 into the engaging position. As a result, the movable reflecting mirror 36, which has been in the lower position, is prevented by the engaging pin 122 from being angularly moved toward the upper position. In addition, since the movable reflecting mirror 36, which is at the lower position, is kept there by gravity, the movable reflecting mirror 36 is more stably retained in the lower position than it is in the upper position.

Therefore, regardless of whether the movable reflecting mirror 36 is in the upper or lower position, it is stably retained in either position by the retaining mechanism 118 even if undesirable shocks and vibrations are applied to the image reading apparatus 10. The movable reflecting mirror 36 remains retained in the upper or lower position unless the driven gear 106 is angularly moved by the intermittent gear 104 that is actuated by the actuator mechanism 48.

While the magnifying power of the variable-power optical system 16 is two times (2×) in the illustrated embodiment, the magnifying power may be set to any desired values by selecting suitable magnifying powers for the first and second fixed-focus lens groups 26, 28. The illustrated variable-power optical system 16 includes two fixed-focus lens groups 26, 28 having different magnifying powers respectively. However, the variable-power optical system 16 may comprise three or more fixed-focus lens groups having respective different magnifying powers.

Although the lens groups 26, 28 are described as having fixed focal points, at least one of them may include a zoom lens system.

The present disclosure relates to subject matters contained in Japanese Patent Application No. HEI 4-244277, filed on Aug. 20, 1992, Japanese Utility Model Application No. HEI 4-63996, filed on Aug. 20, 1992, and Japanese Utility Model Application No. HEI 4-63997, filed on Aug. 20, 1992, which are expressly incorporated herein by reference in their entirety.

What is claimed is:

1. An image reading apparatus for reading an image contained on a document, comprising:

a light source for emitting light to the image of the document;

a predetermined optical path having an incident ray optical axis;

a variable magnification optical system for guiding light reflected by the image through said predetermined optical path with varying magnification of the image; and image sensing means for receiving light reflected by the image and guided by said variable magnification optical system and for sensing the image from said received light, said variable magnification optical system including:

means for focusing said variable magnification optical system at least a first focal length and a second focal length;

a fixed reflecting mirror, positioned along said predetermined optical path, for reflecting an incident light ray along said incident ray optical axis to said focusing means;

a moveable reflecting mirror, moveable between a reflecting position and a retracted position wherein said movable position is along said incident ray optical axis and between said focusing means and said fixed optical reflecting mirror, and said retracted position is remote from said incident ray optical axis, said movable reflecting mirror reflecting an incident light ray to said focusing means when in said reflecting position;

means for selecting one of said at least a first focal length and a second focal length of said focusing means;

a magnification switching system for moving said movable reflecting mirror into said reflecting position in response to a selection of said first focal length of said focusing means by said selecting means, and for moving said movable reflecting mirror into said retracted position in response to a selection of said second focal length of said focusing means by said selecting means; and means for retaining said movable reflecting mirror in said reflecting position in response to said selection of said first focal length, and for retaining said movable reflecting mirror in said retracted position in response to said selection of said second focal length.

2. The image reading apparatus according to claim 1, wherein said focusing means comprises at least first and second fixed-focus lens groups, and wherein said selection of said first focal length corresponds to a selection of said first fixed-focus lens group and said selection of said second focal length corresponds to a selection of said second fixed-focus lens group.

3. The image reading apparatus according to claim 2, further comprising a reflecting surface for directing light reflected from the document to said fixed reflecting mirror.

4. The image reading apparatus according to claim 2, wherein said magnification switching system comprises:

a movable lens mount base for supporting said at least first and second fixed-focus lens groups;

a motor drive; and a transmission mechanism for simultaneously transmitting a driving force from said motor drive to said movable lens mount base and to said movable reflecting mirror.

5. The image reading apparatus according to claim 4, which further comprises:

guide means for guiding said movable lens mount base to move between a first aligned position corresponding to said selection of said first fixed-focus lens group and a second aligned position corresponding to said selection of said second fixed-focus lens group, said guide means further comprising:

a first alignment stop for stopping said movable lens mount base at said first aligned position; and a second alignment stop for stopping said movable lens mount base at said second aligned position.

6. The image reading apparatus according to claim 5, wherein said magnification switching system further comprises:

a first biasing mechanism for pushing said movable lens mount base to said first alignment stop;

a second biasing mechanism for pushing said movable lens mount base to said second alignment stop;

a third biasing mechanism for pushing said movable reflecting mirror to said reflecting position and to said retracted position; and a control unit for controlling said motor drive to move said movable lens mount base.

7. The image reading apparatus according to claim 6, wherein said control unit includes:

means for stopping said movable lens mount base at a first buffer position, just before said first aligned position, as said movable lens mount base moves from said second aligned position to said first aligned position; and means for stopping said movable lens mount base at a second buffer position, just before said second aligned position, as said movable lens mount base moves from said first aligned position to said second aligned position;

wherein said first biasing mechanism includes:

means for pushing said movable lens mount base from said first buffer position to said first aligned position in response to the stopping of said movable lens mount base at said first buffer position;

means for holding said movable lens mount base in abutment against said first alignment stop and in said first aligned position when undisturbed; and means for releasing said movable lens mount base in response to the driving of said movable lens mount base by said transmission mechanism from said first aligned position toward said second aligned position; and wherein said second biasing mechanism includes:

means for pushing said movable lens mount base from said second buffer position to said second aligned position in response to the stopping of said movable lens mount base at said second buffer position;

means for holding said movable lens mount base in abutment against said second alignment stop and in said second aligned position when undisturbed; and means for releasing said movable lens mount base in response to the driving of said movable lens mount base by said transmission mechanism from said second aligned position toward said first aligned position.

8. The image reading apparatus according to claim 6, wherein said control unit includes:

means for stopping said movable reflecting mirror at a first partial position, just before said reflecting position, as said movable reflecting mirror moves from said retracted position to said reflecting position; and means for stopping said movable reflecting mirror at a second partial position, just before said retracted position, as said movable lens mount base moves from said reflecting position to said retracted position; and wherein said third biasing mechanism includes:

means for holding said movable reflecting mirror in said reflecting position when undisturbed;

means for releasing said movable reflecting mirror in response to the driving of said movable reflecting mirror by said transmission mechanism from said reflecting position toward said retracted position;

means for pushing said movable reflecting mirror to said retracted position and for holding said movable reflecting mirror in said retracted position when undisturbed; and means for releasing said movable reflecting mirror in response to the driving of said movable reflecting mirror by said transmission mechanism from said retracted position toward said reflecting position.

9. The image reading apparatus according to claim 8, wherein said retaining means comprises:

an engaging member;

means for moving said engaging member to engage said movable reflecting mirror in response to movement of said movable reflecting mirror into said reflecting position and into said retracted position; and means for moving said engaging member to disengage from said movable reflecting surface in response to movement of said movable reflecting mirror between said reflecting and retracted positions.

10. The image reading apparatus according to claim 7, wherein when said movable lens mount base is located at said first aligned position, said incident ray axis extends from said fixed reflecting mirror through said second fixed-focus lens group, and wherein when said movable lens mount base is located at said second aligned position, said incident ray optical axis extends from said movable reflecting mirror through said first fixed-focus lens group.

11. An image reading apparatus for reading an image contained on a document, comprising:

a light source for emitting light to the image of the document;

a predetermined optical path having an incident ray optical axis;

a variable magnification optical system for guiding light reflected by the image through said predetermined optical path with varying magnification of the image; and image sensing means for receiving light reflected by the image and guided by said variable magnification optical system and for sensing the image from said received light, said variable magnification optical system including:

a first fixed-focus lens group;

a second fixed-focus lens group;

a fixed reflecting mirror, positioned along said predetermined optical path, for reflecting an incident light ray to said second fixed-focus lens group;

means for supporting said first and second fixed-focus lens groups, said supporting means having a first aligned position where said first fixed-focus lens group is aligned with said predetermined optical path and a second aligned position where said second fixed-focus lens group is aligned with said predetermined optical path;

a movable reflecting mirror, movable between a retracted position, remote from said incident ray optical axis, and a reflecting position, along said incident ray optical axis and between said second fixed-focus lens group and said fixed optical reflecting mirror, for reflecting an incident light ray to said first fixed-focus lens group;

means for selecting one of said first and second fixed-focus lens groups; and a magnification switching system for moving said support means to said first position and said movable reflecting mirror into said reflecting position in response to a selection of said first fixed-focus lens group by said selecting means, and for moving said support means to said second position and said movable reflecting mirror into said retracted position in response to a selection of said second fixed-focus lens group by said selecting means.

12. The image reading apparatus according to claim 11, wherein incident light is reflected by said fixed reflecting mirror to said first fixed-focus lens group when said supporting means is located at said first aligned position, and wherein said incident light is reflected by said movable reflecting mirror to said second fixed-focus lens group when said supporting means is located at said second aligned position.

13. The image reading apparatus according to claim 11, wherein said magnification switching system comprises:
   a motor drive;
   a rotating mechanism for rotating said movable reflecting mirror;
   a transmission mechanism for simultaneously transmitting a driving force from said motor drive to said supporting means and to said movable reflecting mirror;
   a first biasing mechanism for pushing said supporting means to a first alignment stop which defines said first aligned position;
   a second biasing mechanism for pushing said supporting means to a second alignment stop which defines said second aligned position;
   a third biasing mechanism for pushing said movable reflecting mirror to said reflecting position and to said retracted position; and
   a control unit for controlling said motor drive to move said supporting means.

14. The image reading apparatus according to claim 13, wherein said control unit includes:
   means for stopping said supporting means at a first buffer position, just before said first aligned position, as said supporting means moves from said second aligned position to said first aligned position, and
   means for stopping said supporting means at a second buffer position, just before said second aligned position, as said supporting means moves from said first aligned position to said second aligned position;
   wherein said first biasing mechanism includes:
      means for pushing said supporting means from said first buffer position to said first aligned position in response to stopping of said supporting means at said first buffer position,
      means for holding said supporting means in abutment against said first alignment stop and in said first aligned position when undisturbed, and
      means for releasing said supporting means in response to driving of said supporting means by said transmission mechanism from said first aligned position toward said second aligned position; and
   wherein said second biasing mechanism includes:
      means for pushing said supporting means from said second buffer position to said second aligned position in response to stopping of said supporting means at said second buffer position,
      means for holding said supporting means in abutment against said second alignment stop and in said second aligned position when undisturbed, and
      means for releasing said supporting means in response to driving of said supporting means by said transmission mechanism from said second aligned position toward said first aligned position.

15. The image reading apparatus according to claim 13, wherein said control unit includes:
   means for stopping said movable reflecting mirror at a first partial position, just before said reflecting position, as said movable reflecting mirror moves from said retracted position to said reflecting position, and
   means for stopping said movable reflecting mirror at a second partial position, just before said retracted position, as said movable reflecting mirror moves from said reflecting position to said retracted position, and
   wherein said third biasing mechanism includes:
      means for holding said movable reflecting mirror in said reflecting position when undisturbed,
      means for releasing said movable reflecting mirror in response to driving of said movable reflecting mirror by said transmission mechanism from said reflecting position toward said retracted position,
      means for pushing said movable reflecting mirror to said retracted position and for holding said movable reflecting mirror in said retracted position when undisturbed, and
      means for releasing said movable reflecting mirror in response to driving of said movable reflecting mirror by said transmission mechanism from said retracted position toward said reflecting position.

16. The image reading apparatus according to claim 14, wherein said supporting means further comprises a connector attached thereto, said connector further comprising:
   a housing having a plurality of slots formed therein, said slots extending in a direction of movement of said means for supporting, between said first aligned position and said second aligned position; and
   a plurality of posts fixedly mounted to said supporting means and movable within said slots.

17. An image reading apparatus for reading an image contained on a document, comprising:
   a light source for emitting light to the image of the document;
   a predetermined optical path having an incident ray optical axis;
   a variable magnification optical system for guiding light reflected by the image through said predetermined optical path with varying magnification of the image; and
   image sensing means for receiving light reflected by the image and guided by said variable magnification optical system and for sensing the image from said received light,
   said variable magnification optical system including:
      a first fixed-focus lens group;
      a second fixed-focus lens group;
      a fixed reflecting mirror, positioned along said predetermined optical path, for reflecting an incident light ray to said second fixed-focus lens group;
      a movable reflecting mirror for reflecting an incident light ray to said first fixed-focus lens group, movable between a retracted position, remote from said incident ray optical axis, and a reflecting position, along said incident ray optical axis and between said second fixed-focus lens group and said fixed optical reflecting mirror;

means for selecting one of said first and second fixed-focus lens groups; and a magnification switching system for moving said movable reflecting mirror into said reflecting position in response to a selection of said first fixed-focus lens group by said selecting means, and for moving said movable reflecting mirror into said retracted position in response to a selection of said second fixed-focus lens group by said selecting means.

18. The image reading apparatus according to claim 17, further comprising:

means for retaining said movable reflecting mirror in said reflecting position in response to said selection of said first fixed-focus lens group, and for retaining said movable reflecting mirror in said retracted position in response to said selection of said second fixed-focus lens group.

19. The image reading apparatus according to claim 18, wherein said magnification switching system comprises:

a motor drive;

a rotating mechanism for rotating said movable reflecting mirror;

a transmission mechanism for simultaneously transmitting a driving force from said motor drive to said supporting means and to said movable reflecting mirror;

a control unit for controlling said motor drive to move said supporting means; and a biasing mechanism for pushing said movable reflecting mirror to said reflecting position and to said retracted position.

20. The image reading apparatus according to claim 19, wherein said control unit includes:

means for stopping said movable reflecting mirror at a first partial position, just before said reflecting position, as said movable reflecting mirror moves from said retracted position to said reflecting position, and means for stopping said movable reflecting mirror at a second partial position, just before said retracted position, as said movable reflecting mirror moves from said reflecting position to said retracted position; and wherein said biasing mechanism includes:

means for holding said movable reflecting mirror in said reflecting position when undisturbed, means for releasing said movable reflecting mirror in response to driving of said movable reflecting mirror by said transmission mechanism from said reflecting position toward said retracted position, means for pushing said movable reflecting mirror to said retracted position and for holding said movable reflecting mirror in said retracted position when undisturbed, and means for releasing said movable reflecting mirror in response to driving of said movable reflecting mirror by said transmission mechanism from said retracted position toward said reflecting position.

21. The image reading apparatus according to claim 20, wherein said biasing mechanism comprises:

an engaging member;

means for moving said engaging member to engage said movable reflecting mirror in response to movement of said movable reflecting mirror into said reflecting position and into said retracted position; and means for moving said engaging member to disengage from said movable reflecting surface in response to movement of said movable reflecting mirror between said reflecting and retracted positions.

22. The image reading apparatus according to claim 21, wherein incident light is reflected by said fixed reflecting mirror to said first fixed-focus lens group when said first fixed-focus lens group is selected, and wherein said incident light is reflected by said movable reflecting mirror to said second fixed-focus lens group when said second fixed-focus lens group is selected.

23. An image reading apparatus for reading an image contained on a document, comprising:

a light source for emitting light to the image of the document;

a predetermined optical path having an incident ray optical axis;

a variable magnification optical system for guiding light reflected by the image through said predetermined optical path with varying magnification of the image; and image sensing means for receiving light reflected by the image and guided by said variable magnification optical system and for sensing the image from said received light, said variable magnification optical system including:

a first fixed-focus lens group having a first optical axis;

a second fixed-focus lens group having a second optical axis parallel to said first optical axis and said incident ray optical axis;

means for moving said first and second fixed-focus lens groups simultaneously, in a plane containing both of said first and second optical axes and along a direction perpendicular to both of said first and second optical axes, said means for moving said first and second fixed-focus lens groups together being capable of moving either of said first and second optical axes into alignment with said incident ray optical axis while simultaneously moving the remaining one of said first and second optical axes out of said predetermined optical path;

a fixed reflecting mirror for reflecting said reflected light to said second fixed-focus lens group and on to said image sensing means, said fixed reflecting mirror being positioned along said predetermined optical path;

a movable reflecting mirror for reflecting an incident light ray to said first fixed-focus lens group and on to said image sensing means, said movable reflecting mirror movable between a retracted position, remote from said incident ray optical axis, and a reflecting position, along said incident ray optical axis and between said second fixed-focus lens group and said fixed optical reflecting mirror; and a magnification switching system for moving said movable reflecting mirror into said predetermined optical path, and between said first fixed-focus lens group and said fixed optical reflecting mirror, in response to a movement of said first optical axis into alignment with said incident ray optical axis, and for moving said movable reflecting mirror out of said predetermined optical path in response to a movement of said second optical axis into alignment with said incident ray optical axis.

24. The image reading apparatus according to claim 23, wherein said means for moving said first and second fixed-focus lens groups simultaneously comprises a movable lens mount base, and wherein said first and second lens fixed-focus groups are both mounted on said movable lens mount base.

25. The image reading apparatus according to claim 24, wherein said magnification switching system comprises a single motor for driving both said movable lens mount base and said movable reflecting mirror.

26. The image reading apparatus according to claim 24, wherein said movable reflecting mirror is provided with a rotatably supported shaft, said movable reflecting mirror being angularly movable about said rotatably supported shaft, between said retracted position and said reflecting position.

27. The image reading apparatus according to claim 26, wherein said magnification switching system comprises;
a single motor;
an actuating mechanism for moving said movable lens mount base with drive forces from said single motor; and
a turning mechanism for angularly moving said movable reflecting mirror with drive forces from said single motor.

28. The image reading apparatus according to claim 26, wherein said movable reflecting mirror is pivoted about said rotatably supported shaft and angularly moved upwardly of said predetermined optical path when moved to said retracted position, and pivoted about said rotatably supported shaft and angularly moved downwardly of said retracted position when moved to said reflecting position.

29. The image reading apparatus according to claim 27, wherein said magnification switching system further comprises;
a drive force transmitting element for transmitting drive forces from said motor to said actuating mechanism and said turning mechanism.

30. The image reading apparatus according to claim 29, wherein said magnification switching mechanism further comprises:
a connector connected to said movable lens mount base; and
means for allowing a predetermined amount of relative movement between said connector and said movable lens mount base in a direction in which said lens mount base is movable,
wherein said drive force transmitting element comprises a single wire having opposite ends coupled to said connector.

31. The image reading apparatus according to claim 24, wherein said magnification switching mechanism comprises:
a single motor;
actuating means for moving said movable lens mount base between a first buffer position immediately in front of said first aligned position and a second buffer position immediately in front of said second aligned position with drive forces from said single motor;
a control unit for de-energizing said motor when said movable lens mount base is moved to said first or second buffer position;
a first biasing mechanism for pushing said movable lens mount base from said first buffer position into said first aligned position; and
a second biasing mechanism for pushing said movable lens mount base from said second buffer position into said second aligned position.

32. The image reading apparatus according to claim 31, wherein each of said first and second biasing mechanisms comprises a coil spring for resiliently biasing said movable lens mount base.

33. The image reading apparatus according to claim 24, further comprising:
guide means for guiding said movable lens mount base to move between said first and second aligned positions, said guide means guiding said movable lens mount base along a path transverse to said predetermined optical path.

34. The image reading apparatus according to claim 33, wherein said guide means includes a first alignment stop for engaging said movable lens mount base to position said movable lens mount base in said first aligned position and a second alignment stop, spaced from said first alignment stop, for engaging said movable lens mount base to position said movable lens mount base in said second aligned position.

35. The image reading apparatus according to claim 34, wherein said magnification switching mechanism comprises:
an actuator for moving said movable lens mount base between a first buffer position immediately short of said first aligned position, as said movable lens mount base moves in a direction from said second aligned position to said first aligned position, and a second buffer position immediately short of said second aligned position, as said movable lens mount base moves in a direction from said first aligned position to said second aligned position;
a control unit for de-energizing said actuator when said movable lens mount base is moved to said first or second buffer position;
a first biasing mechanism for pushing said movable lens mount base from said first buffer position into engagement with said first alignment stop and into said first aligned position; and
a second biasing mechanism for pushing said movable lens mount base from said second buffer position into engagement with said second alignment stop and into said second aligned position.

36. An image reading apparatus for reading an image contained on a document, comprising:
a light source for emitting light to the image of the document;
a predetermined optical path having an incident ray optical axis;
a variable magnification optical system for guiding light reflected by the image through said predetermined optical path with varying magnification of the image; and
image sensing means for receiving light reflected by the image and guided by said variable magnification optical system and for sensing the image from said received light,
said variable magnification optical system including:
a first fixed-focus lens group having a first optical axis;
a second fixed-focus lens group having a second optical axis parallel to said first optical axis and said incident ray optical axis;
a movable lens mount base on which said first fixed-focus lens group and said second fixed-focus lens group are mounted, said movable lens mount base being movable between a first aligned position, defined by a coincidence of said first optical axis and said incident ray optical axis and a second aligned position, defined by a coincidence of said second optical axis and said incident ray optical axis;

means for guiding the movement of said movable lens mount base between said first and second aligned positions;

a first alignment stop at said first aligned position for restraining said movable lens mount base in said first aligned position, an actuator mechanism for moving said movable lens mount base reciprocatively between said first and second aligned positions;

a control unit for controlling said actuator mechanism to move said movable lens mount base, said control unit stopping said movable lens mount base at a buffer position, just before said first aligned position, as said movable lens mount base moves from said second aligned position to said first aligned position; and a biasing mechanism for pushing said movable lens mount base from said buffer position to said first aligned position in response to stopping of said movable lens mount base at said buffer position, for holding said movable lens mount base in abutment against said first alignment stop and in said first aligned position when undisturbed, and for releasing said movable lens mount base in response to driving of said movable lens mount base by said actuator mechanism from said first aligned position toward said second aligned position.

37. The image reading apparatus according to claim 36, wherein said biasing mechanism comprises:

a protruding member mounted on said movable lens mount base for movement in unison therewith; and a toggle pusher including a pushable arm, pushable by said protruding member as said movable lens mount base moves from said second aligned position toward said first aligned position under drive forces from said actuating means, and a pushing arm to push said protruding member to move said movable lens mount base from said buffer position to said first aligned position in response to a release of said protruding member by said actuating mechanism, said pushable arm and said pushing arm being linked to be angularly movable together and extending at an angle to each other;

a support shaft supporting said toggle pusher for angular movement between a pushable position in which said pushable arm extends into a movement path of said protruding member while said pushing arm is swung away from said movement path of said protruding member and said protruding member engages said pushable arm, and a pushing position in which said pushing arm extends into said movement path of said protruding member while said pushable arm is swung away from said movement path of said protruding member and said pushing arm pushes said protruding member; and a biasing member for resiliently holding said toggle pusher in said pushable position and in said pushing position, said biasing member being connected to said toggle pusher at a point displaced from an axis of said angular movement of said toggle pusher to bias said toggle pusher in a direction of said angular movement in response to movement of said biasing member across said support shaft and across said axis of angular movement of said toggle pusher, upon angular movement of said toggle pusher.

38. The image reading apparatus according to claim 37, wherein said biasing member comprises a coil spring connected under tension to said toggle pusher such that an axis of said coil spring moves across an axis of said support shaft and across said axis of angular movement of said toggle pusher upon angular movement of said toggle pusher between said pushable position and said pushing position, wherein said toggle pusher is biased in said direction of angular movement as said axis of said coil spring crosses said axis of said support shaft and said axis of angular movement of said toggle pusher.

39. An image reading apparatus for reading an image contained on a document, comprising:

a light source for emitting light to the image of the document;

a predetermined optical path having an incident ray optical axis;

a variable magnification optical system for guiding light reflected by the image through said predetermined optical path with varying magnification of the image; and image sensing means for receiving light reflected by the image and guided by said variable magnification optical system and for sensing the image from said received light, said variable magnification optical system including:

a first fixed-focus lens group having a first optical axis;

a second fixed-focus lens group having a second optical axis parallel to said first optical axis and said incident ray optical axis;

a movable lens mount base on which said first fixed-focus lens group and said second fixed-focus lens group are mounted, said movable lens mount base being movable between a first aligned position, defined by a coincidence of said first optical axis and said incident ray optical axis, and a second aligned position, defined by a coincidence of said second optical axis and said incident ray optical axis;

means for guiding the movement of said movable lens mount base between said first and second aligned position;

a first alignment stop at said first aligned position for restraining said movable lens mount base in said first aligned position;

a second alignment stop at said second aligned position for restraining said movable lens mount base in said second aligned position;

an actuator mechanism for moving said movable lens mount base reciprocatively between said first and second aligned positions;

a control unit for controlling said actuator mechanism to move said movable lens mount base, said control unit stopping said movable lens mount base at a first buffer position, just before said first aligned position, as said movable lens mount base moves from said second aligned position to said first aligned position, and at a second buffer position, just before said second aligned position, as said movable lens mount base moves from said first aligned position to said second aligned position;

a first biasing mechanism for pushing said movable lens mount base from said first buffer position to said first aligned position in response to stopping of said movable lens mount base at said first buffer position, and for holding said movable lens mount base in abutment against said first alignment stop and in said first aligned position when undisturbed, and for releasing said movable lens mount base in response to driving of said movable lens mount base by said actuator mechanism from said first aligned position toward said second aligned position; and a second biasing mechanism for pushing said movable lens mount base from said second buffer position to said second aligned position in response to stopping of said movable lens mount base at said second buffer position, and for holding said movable lens mount base in abutment against said second alignment stop and in said second aligned position when undisturbed, and for releasing said movable lens mount base in response to driving of said movable lens mount base by said actuator mechanism from said second aligned position toward said first aligned position.

40. The image reading apparatus according to claim 39, wherein said first biasing mechanism comprises:

a first protruding member mounted on said movable lens mount base for movement in unison therewith; and a first toggle pusher including a pushable arm pushable by said first protruding member as said movable lens mount base moves from said second aligned position toward said first aligned position under drive forces from said actuating means, and a pushing arm to push said first protruding member to move said movable lens mount base from said first buffer position to said first aligned position in response to a release of said first protruding member by said actuating mechanism, said pushable arm and said pushing arm being linked to be angularly movable together and extending at an angle to each other;

a first support shaft supporting said first toggle pusher for angular movement between a pushable position in which said pushable arm extends into a movement path of said first protruding member while said pushing arm is swung away from said movement path of said first protruding member and said first protruding member engages said pushable arm, and a pushing position in which said pushing arm extends into said movement path of said first protruding member while said pushable arm is swung away from said movement path of said first protruding member and said pushing arm pushes said first protruding member; and a first biasing member for resiliently holding said first toggle pusher in said pushable position and in said pushing position, said first biasing member being connected to said first toggle pusher at a point displaced from an axis of said angular movement of said first toggle pusher to bias said first toggle pusher in a direction of said angular movement in response to movement of said first biasing member across said first support shaft and across said axis of angular movement of said first toggle pusher, upon angular movement of said first toggle pusher.

41. The image reading apparatus according to claim 40, wherein said first biasing member comprises a coil spring connected under tension to said first toggle pusher such that an axis of said coil spring moves across an axis of said first support shaft and across said axis of angular movement of said first toggle pusher upon angular movement of said first toggle pusher between said pushable position and said pushing position, wherein said first toggle pusher is biased in said direction of angular movement as said axis of said coil spring crosses said axis of said first support shaft and said axis of angular movement of said first toggle pusher.

42. The image reading apparatus according to claim 40, wherein said first protruding member comprises a bar projecting from and fixed to said movable lens mount base.

43. The image reading apparatus according to claim 39, wherein said second biasing mechanism comprises:

a second protruding member mounted on said movable lens mount base for movement in unison therewith; and a second toggle pusher including a pushable arm pushable by said second protruding member as said movable lens mount base moves from said first aligned position toward said second aligned position under drive forces from said actuating means, and a pushing arm to push said second protruding member to move said movable lens mount base from said second buffer position to said second aligned position in response to a release of said second protruding member by said actuating mechanism, said pushable arm and said pushing arm being linked to be angularly movable together and extending at an angle to each other;

a second support shaft supporting said second toggle pusher for angular movement between a pushable position in which said pushable arm extends into a movement path of said second protruding member while said pushing arm is swung away from said movement path of said second protruding member and said second protruding member engages said pushable arm, and a pushing position in which said pushing arm extends into said movement path of said second protruding member while said pushable arm is swung away from said movement path of said second protruding member and said pushing arm pushes said second protruding member; and a second biasing member for resiliently holding said second toggle pusher in said pushable position and in said pushing position, said second biasing member being connected to said second toggle pusher at a point displaced from an axis of said angular movement of said second toggle pusher to bias said second toggle pusher in a direction of said angular movement in response to movement of said second biasing member across said second support shaft and across said axis of angular movement of said second toggle pusher, upon angular movement of said second toggle pusher.

44. The image reading apparatus according to claim 43, wherein said second biasing member comprises a coil spring connected under tension to said second toggle pusher such that an axis of said coil spring moves across an axis of said second support shaft and across said axis of angular movement of said second toggle pusher upon angular movement of said second toggle pusher between said pushable position and said pushing position, wherein said second toggle pusher is biased in said direction of angular movement as said axis of said coil spring crosses said axis of said second support shaft and said axis of angular movement of said second toggle pusher.

45. The image reading apparatus according to claim 43, wherein said second protruding member comprises a bar projecting from and fixed to said movable lens mount base.

46. The image sensing apparatus according to claim 23, wherein said magnification switching system includes:

a turning mechanism for reversibly angularly moving said movable reflecting mirror in a mirror movement range defined between said retracted position and said reflecting position;

an engaging pin movable between an engaging position in which said engaging pin projects into said mirror movement range to prevent said reflecting mirror from angularly moving from said retracted position to said reflecting position, and a disengaged position in which said engaging pin is withdrawn out of said mirror movement range to allow said reflecting mirror to angularly move from said retracted position to said reflecting position;

displacing means for displacing said engaging pin into said engaging position when said reflecting mirror is in said retracted position; and withdrawing means for withdrawing said engaging pin from said engaging position to said disengaged position when said reflecting mirror is angularly moved from said retracted position to said reflecting position by said turning mechanism.

47. The image reading apparatus according to claim 46, wherein said turning mechanism comprises:

a motor;

a driven member rotatably driven by said motor; and a drive transmission for transmitting drive forces from said motor to said driven member; and wherein said displacing means comprises:

a cam mounted on said driven member and having a cam surface engageable by said engaging pin; and a first biasing member for normally and resiliently holding said engaging pin against said cam surface, whereby said engaging pin is reciprocally movable between said engaging position and said disengaged position by said cam upon rotation of said driven member.

48. The image reading apparatus according to claim 47, wherein said driven member comprises a driven gear, and said turning mechanism further comprises a second biasing member coupled to said driven gear for resiliently holding said reflecting mirror in said retracted position and in said reflecting position, and wherein said second biasing member is connected to said toggle pusher at a point displaced from an axis of said angular movement of said reflecting mirror to bias said reflecting mirror in a direction of said angular movement in response to movement of said second biasing member across said driven gear upon angular movement of said second driven gear and said toggle pusher.

49. The image reading apparatus according to claim 48, wherein said second biasing member comprises a coil spring connected under tension to said driven gear such that an axis of said coil spring moves across an axis of said driven gear upon angular movement of said reflecting mirror between said retracted position and said reflecting position, and said driven gear is thereby biased in a direction of said angular movement as said axis of said coil spring crosses said axis of said driven gear.

50. The image reading apparatus according to claim 49, wherein said drive transmission rotatably drives an intermittent gear, and said intermittent gear includes an integral gear sector having gear teeth capable of meshing with said driven gear, wherein said gear teeth of said integral gear sector are held out of mesh with said driven gear when said reflecting mirror is in said retracted or reflecting position, and said gear teeth of said integral gear sector mesh with said driven gear and rotate said drive gear to move said axis of said coil spring across said axis of said driven gear in response to rotation of said intermittent gear by said motor through said drive transmission.

51. The image reading apparatus according to claim 46, wherein said retracted position is an upper position and said reflecting position is a lower position which is lower than said retracted position.

52. The image reading apparatus according to claim 23, wherein incident light is reflected by said fixed reflecting mirror to said first fixed-focus lens group when said means for moving said first and second fixed-focus lens groups together aligns said first optical axis with said incident ray optical axis, and wherein said incident light is reflected by said movable reflecting mirror to said second fixed-focus lens group when said means for moving said first and second fixed-focus lens groups together aligns said second optical axis with said incident ray optical axis.

* * * * *